United States Patent
Ohta et al.

(10) Patent No.: US 11,202,327 B2
(45) Date of Patent: Dec. 14, 2021

(54) WIRELESS COMMUNICATION SYSTEM, MOBILE STATION, BASE STATION, AND WIRELESS COMMUNICATION METHOD

(71) Applicant: FUJITSU CONNECTED TECHNOLOGIES LIMITED, Kawasaki (JP)

(72) Inventors: Yoshiaki Ohta, Yokohama (JP); Shinichiro Aikawa, Yokohama (JP)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 10 days.

(21) Appl. No.: 16/210,383

(22) Filed: Dec. 5, 2018

(65) Prior Publication Data

US 2019/0110328 A1    Apr. 11, 2019

Related U.S. Application Data

(63) Continuation of application No. 14/933,582, filed on Nov. 5, 2015, now Pat. No. 10,212,749, which is a
(Continued)

(51) Int. Cl.
*H04W 76/15* (2018.01)
*H04W 28/08* (2009.01)
(Continued)

(52) U.S. Cl.
CPC ............ *H04W 76/15* (2018.02); *H04B 7/026* (2013.01); *H04W 16/32* (2013.01); *H04W 28/08* (2013.01); *H04W 36/023* (2013.01); *H04W 40/22* (2013.01)

(58) Field of Classification Search
None
See application file for complete search history.

(56) References Cited

U.S. PATENT DOCUMENTS

| | | | |
|---|---|---|---|
| 2007/0270146 A1 | 11/2007 | Suzuki et al. | |
| 2010/0130208 A1* | 5/2010 | Hayashi | H04W 36/02 455/436 |

(Continued)

FOREIGN PATENT DOCUMENTS

| | | |
|---|---|---|
| JP | 2005-142808 A | 6/2005 |
| JP | 2007-158699 A | 6/2007 |

(Continued)

OTHER PUBLICATIONS

Extended European search report with the European search report or the partial European search report/ declaration of no search and the European search opinion issued by the European Patent Office for corresponding European Patent Application No. 19205198.5-1215, dated Feb. 11, 2020.
(Continued)

*Primary Examiner* — Shripal K Khajuria
(74) *Attorney, Agent, or Firm* — Myers Wolin, LLC

(57) ABSTRACT

A mobile station including: a communication unit that includes a first logical processing subject and a second logical processing subject that operates in association with the first logical processing subject and performs multiple communications with a first wireless communication apparatus and a second wireless communication apparatus; an accumulation unit that accumulates data received from the second wireless communication apparatus; and a notifying unit that notifies the first wireless communication apparatus of data receiving status in the accumulation unit.

10 Claims, 20 Drawing Sheets

Related U.S. Application Data continuation of application No. PCT/JP2013/063218, filed on May 10, 2013.

(51) Int. Cl.
  *H04B 7/026* (2017.01)
  *H04W 16/32* (2009.01)
  *H04W 36/02* (2009.01)
  *H04W 40/22* (2009.01)

(56) References Cited

U.S. PATENT DOCUMENTS

| | | | |
|---|---|---|---|
| 2010/0272033 A1 | 10/2010 | Fwu et al. | |
| 2010/0302946 A1 | 12/2010 | Yang et al. | |
| 2010/0302949 A1 | 12/2010 | Fukagawa | |
| 2011/0164694 A1 | 7/2011 | Yamasaki et al. | |
| 2013/0010702 A1* | 1/2013 | Aminaka | H04W 76/15 370/328 |
| 2013/0088960 A1* | 4/2013 | Bi | H04L 43/04 370/235 |
| 2013/0343261 A1* | 12/2013 | Gonsa | H04L 5/001 370/315 |
| 2014/0314009 A1* | 10/2014 | Xiong | H04W 76/14 370/329 |

FOREIGN PATENT DOCUMENTS

| | | |
|---|---|---|
| JP | 2010-135909 A | 6/2010 |
| JP | 2012-525786 A | 10/2012 |
| WO | 2011-125278 A1 | 10/2011 |
| WO | 2012-006120 A1 | 1/2012 |
| WO | 2013/048049 A1 | 4/2013 |
| WO | 2013/049998 A1 | 4/2013 |
| WO | 2013-058304 A1 | 4/2013 |

OTHER PUBLICATIONS

Research In Motion, UK Limited, "Discussion on Protocol Stack Support in Small Cell eNB", Agenda Item: 7.2, 3GPP TSG RAN WG2 Meeting #81, R2-130068, St. Julian's, Malta, Jan. 28-Feb. 1, 2013.

3GPP TR 36.932 V12.1.0, "3rd Generation Partnership Project; Technical Specification Group Radio Access Network Scenarios and requirements for small cell enhancements for E-UTRA and E-UTRAN (Release 12)", Mar. 2013.

International Search Report with Written Opinion of the International Searching Authority issued for corresponding International Patent Application No. PCT/JP2013/063218, dated Jun. 4, 2013, with an English translation.

Huawei et al., "Study of Solutions and Radio Protocol Architecture for Dual-Connectivity", Agenda Item: 7.2, 3GPP TSG-RAN WG2 Meeting #81bis, R2-131164, 3rd Generation Partnership Project (3GPP), Chicago, IL (US), Apr. 15-19, 2013.

Intel Corporation, "Impacts of Splitting a Single EPS Bearer between Two (or more) eNBs", Agenda Item: 7.2, 3GPP TSG RAN WG2 Meeting #81 bis, R2-131401, Chicago, IL (US), Apr. 15-19, 2013.

Extended European search report with the supplementary European search report and the European search opinion issued for corresponding European Patent Application No. 13883916.2 dated Mar. 23, 2016.

Notice of Preliminary Rejection issued by the Korean Intellectual Property Office for corresponding Korean Patent Application No. 10-2015-7031821, dated Aug. 19, 2016, with English translation.

Office Action issued by the Japan Patent Office for corresponding Japanese Patent Application No. 2015-515764, dated Jan. 17, 2017, with a partial English translation.

Communication pursuant to Article 94(3) EPC issued by the European Patent Office for corresponding European Patent Application No. 13 883 916.2-1857, dated Dec. 1, 2017.

"2nd Notification of Office Action" dated Jul. 24, 2018 and issued by the State intellectual Property Office Of China for corresponding Chinese Application No. 201380076442.8. English translation attached.

Notification of Reasons for Refusal issued by the Japan Patent Office for corresponding Japanese Patent Application No. 2017-094984, dated May 8, 2018, with an English translation.

Interdigital Communications, "User Plane Architecture for Dual-Connectivity", Agenda Item: 7.2, 3GPP TSG-RAN WG2 Meeting #81bis, R2-131327, Chicago, USA, Apr. 15-19, 2013.

Huawei, "Flow control between eNB and UE", Agenda Item: 5.1.2.4, 3GPP TSG-RAN WG2 Meeting #59 bis, R2-073969, Shanghai, China, Oct. 8-12, 2007.

First Notification of Office Action issued by the State intellectual Property Office of China for corresponding Chinese Patent Application No. 201330076442.8, dated Jan. 22, 2013, with an English translation.

Notification of Reasons for Refusal issued by the Japan Patent Office for corresponding Japanese Patent Application No. 2017-094984, dated Oct. 30, 2018, with an English translation.

Pantech, "Considerations on Scheduler Architecture for dual connectivity", Agenda Item: 7.2, 3GPP TSG-RAN WG2 Meeting #81bis, R2-131095, Chicago, USA, Apr. 15-19, 2013.

Nec, "Consideration of the possible structures on the dual connectivity", Agenda Items: 19, 3GPP TSG-RAN WG3 Meeting #79, R3-130133, St. Julian's, Malta, Jan. 28-Feb. 1, 2013.

Non-Final Office Action issued by the United States Patent and Trademark Office for corresponding U.S. Appl. No. 14/933,582, electronically delivered on May 10, 2018.

Non-Final Office Action issued by the United States Patent and Trademark Office for corresponding U.S. Appl. No. 14/933,582, electronically delivered on Jul. 3, 2017.

Final Office Action issued by the United States Patent and Trademark Office for corresponding U.S. Appl. No. 14/933,582, electronically delivered on Dec. 28, 2017.

First Office Action with Search Report issued by the State Intellectual Property Office of People's Republic of China for corresponding Chinese Patent Application No. 201811165977.3, dated Jun. 3, 2021.

* cited by examiner

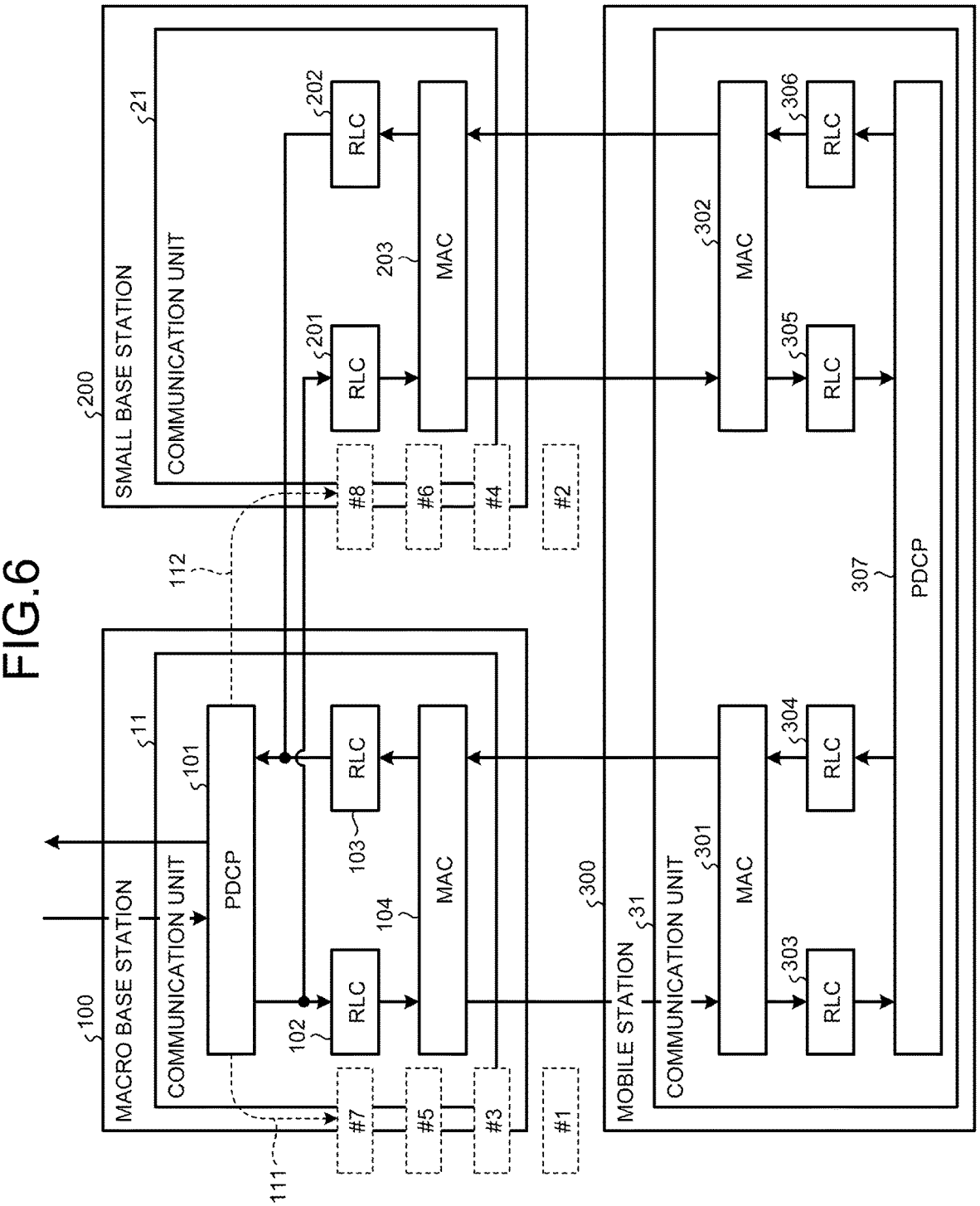

| Bit | Description |
|---|---|
| 000 | PDCP status report |
| 001 | Interspersed ROHC feedback packet |
| 010-111 | Reserved |

| CPT | Description |
|---|---|
| 001 | FEEDBACK INFORMATION ON SECONDARY CONNECTION |
| 002 | FEEDBACK INFORMATION ON THIRD CONNECTION |
| 003-111 | RESERVE |

WIRELESS COMMUNICATION SYSTEM, MOBILE STATION, BASE STATION, AND WIRELESS COMMUNICATION METHOD

This application is continuation application U.S. Utility patent application Ser. No. 14/933,582, filed on Nov. 5, 2015, which is a continuation of International Application PCT/JP2013/063218 filed on May 10, 2013 and designating the U.S., the entire contents of each are incorporated herein by reference.

FIELD

The present invention relates to a wireless communication system, a mobile station, a base station, and a wireless communication method.

BACKGROUND

Conventionally, various efforts have been made to increase the transmission capacity of a wireless communication system (hereinafter, may be referred to as a "system capacity"). For example, in the 3rd Generation Partnership Project Radio Access Network Long Term Evolution (3GPP LTE), discussion has been made on a technique for increasing the system capacity by utilizing a "small cell (SC)" in addition to a "macrocell". A "cell" herein is a term representing a range covered by a wireless base station for transmission and reception of wireless signals by wireless terminals. The wireless base station and the cell indicate substantially corresponding concepts; therefore, in the explanation below, the "cell" may be interpreted as the "wireless base station" as appropriate. Further, the "macrocell" is a base station that can perform transmission with high transmission power, that is, a cell of a base station with a large coverage area. Furthermore, the "small cell" is a base station that performs transmission with low transmission power, that is, a cell of a base station with a small coverage area.

In the 3GPP LTE, as a configuration of a mobile communication system, a configuration including a plurality of small cells in a macrocell has been studied, for example. Further, a technique for simultaneously connecting a mobile station to a macrocell and a small cell has been studied. Furthermore, a technique for simultaneously connecting a mobile station to two different small cells has been studied. In this manner, communication performed by a mobile station simultaneously connecting to two different cells may be referred to as a dual connection (dual connectivity) in some cases. Alternatively, as the dual connectivity, there is a case where a base station directly connects to a higher-layer device. However, the configuration is not limited to the above, and, in general, the dual connectivity means that a terminal connects to and simultaneously communicates with a plurality of base stations to simultaneously transmit and receive different kinds of information to and from the base stations. In the explanation below, the dual connectivity is described; however, the same discussion can be applied to multiple connectivity such as triple or more connectivity. Therefore, the dual connectivity in the description below may be regarded as a concept including multiple connectivity, or the dual connectivity may be interpreted as multiple connectivity.

If a mobile station simultaneously connects to a macrocell and a small cell, for example, a control plane, which is a call to transmit L3 control information to set a transmission channel for transmitting data or to control a handover, is connected to the macrocell. Further, a data plane, which is a call to transmit and receive data, is connected to the small cell. Meanwhile, the control plane may be referred to as a C-plane or a signaling radio bearer (SRB). Further, the data plane may be referred to as a user plane, a U-plane, or a data radio bearer (DRB).

Furthermore, if a mobile station simultaneously connects to two different small cells, for example, it may be possible to employ a configuration in which the control plane is connected to one of the small cells and the data plane is connected to the other one of the small cells, or a configuration in which the data plane is connected to both of the base stations. As described above, in general, the dual connectivity means that a terminal connects to and simultaneously communicates with a plurality of base stations to simultaneously transmit and receive different kinds of information to and from the base stations.

In this manner, in the dual connectivity, a wireless base station to which a control plane is connected may be referred to as a primary wireless base station (cell). Further, a wireless base station (cell) to which a data plane for performing data communication in cooperation with the primary wireless base station (cell) may be referred to as a secondary wireless base station. Furthermore, these base stations may be respectively referred to as an anchor wireless base station (cell) and an assisting wireless base station (cell). Moreover, these base stations may be respectively referred to as a master wireless base station (cell) and a slave wireless base station (cell). Incidentally, in the case of the dual connectivity, to improve the communication characteristics, if a wireless communication terminal has a capability to receive pieces of data from two wireless base stations, it may be possible to employ a configuration in which each of the primary wireless base station and the secondary wireless base station outputs data to the wireless communication terminal. However, names of the wireless base stations are not limited to those described above. In general, as in a conventional LTE communication system, if a wireless base station that connects to and performs communication with both of a control plane and a data plane serves as a main base station, various names may be employed without departing from this intention. Hereinafter, for the sake of simplicity, terms "primary" and "secondary" are used.

As the configuration of the dual connectivity, various configurations have been proposed depending on at which of layers the data plane is separated.

For example, there is a configuration in which the data plane is separated in a stage before a packet data convergence protocol (PDCP) layer. Further, for example, there is a configuration in which the data plane is separated between the PDCP layer and a radio link control (RLC) layer. Furthermore, for example, there is a configuration in which the data plane is separated between the RLC layer and a medium access control (MAC) layer. The configurations are not limited to the above, and it is possible to employ a configuration in which separation is performed within a layer. For example, it may be possible to employ a configuration in which a part of the functions of the PDCP layer is implemented by a primary base station, and the rest of the functions of the PDCP layer is implemented by a secondary base station. The same applies to the RLC layer and the MAC layer.

If the configuration of the dual connectivity is employed, a primary wireless base station and a secondary wireless base station are connected by a wired link or a wireless link. Then, after the data plane is separated, data is sent to the secondary wireless base station via the link connecting the primary wireless base station and the secondary wireless base station.

Non Patent Document 1: 3GPP TR 36.932 V12.1.0 (2013-03), 3rd Generation Partnership Project; Technical Specification Group Radio Access Network; Scenarios and requirements for small cell enhancements for E-UTRA and E-UTRAN (Release 12)

However, in the dual connectivity, in the secondary wireless base station, the MAC layer may acquire, from the RLC layer, pieces of data corresponding to a transmittable amount and transmit the pieces of data on the basis of an amount of transmitted data notified by a physical (PHY) layer. Alternatively, the MAC layer may acquire, from the RLC layer, pieces of data corresponding to a transmittable amount and transmit the pieces of data on the basis of transmittable data corresponding to a wireless quality notified by the PHY layer. In this case, the PDCP layer acquires a retention amount of data in the RLC layer, and thereafter sends pieces of data corresponding to the acquired retention amount to the RLC layer. In this configuration, the PDCP layer acquires the retention amount of data in the RLC layer via the link connecting the primary wireless base station and the secondary wireless base station. However, when the communication quality of the link connecting the primary wireless base station and the secondary wireless base station is not high, acquisition of the retention amount of data in the RLC layer by the PDCP layer may be delayed. In this case, the amount of data transmitted from the PDCP layer is not controlled appropriately, and data delivery from the PDCP layer may be delayed. Further, it is difficult to reflect the latest state of the retention amount of data in the RLC layer, so that a greater amount of data than the amount that can be stored in the RLC layer (buffering is possible) may be delivered from the PDCP layer to the RLC layer and the data may be discarded.

SUMMARY

According to an aspect of an embodiment, a wireless communication system includes: a first wireless communication device; and a second wireless communication device, wherein the first wireless communication device includes: a first communication unit that includes a first logical processing subject and a second logical processing subject that operates in association with the first logical processing subject, and performs multiple communications with the second wireless communication device; and a notifying unit that notifies the second wireless communication device of data related information, and the second wireless communication device includes: a second communication unit that transmits data; and a control unit that receives the data related information from the notifying unit and controls an amount of data transmitted by the second communication unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram for explaining the flow of pieces of user data to which numbers are regularly assigned.

DESCRIPTION OF EMBODIMENTS

Figure 1:
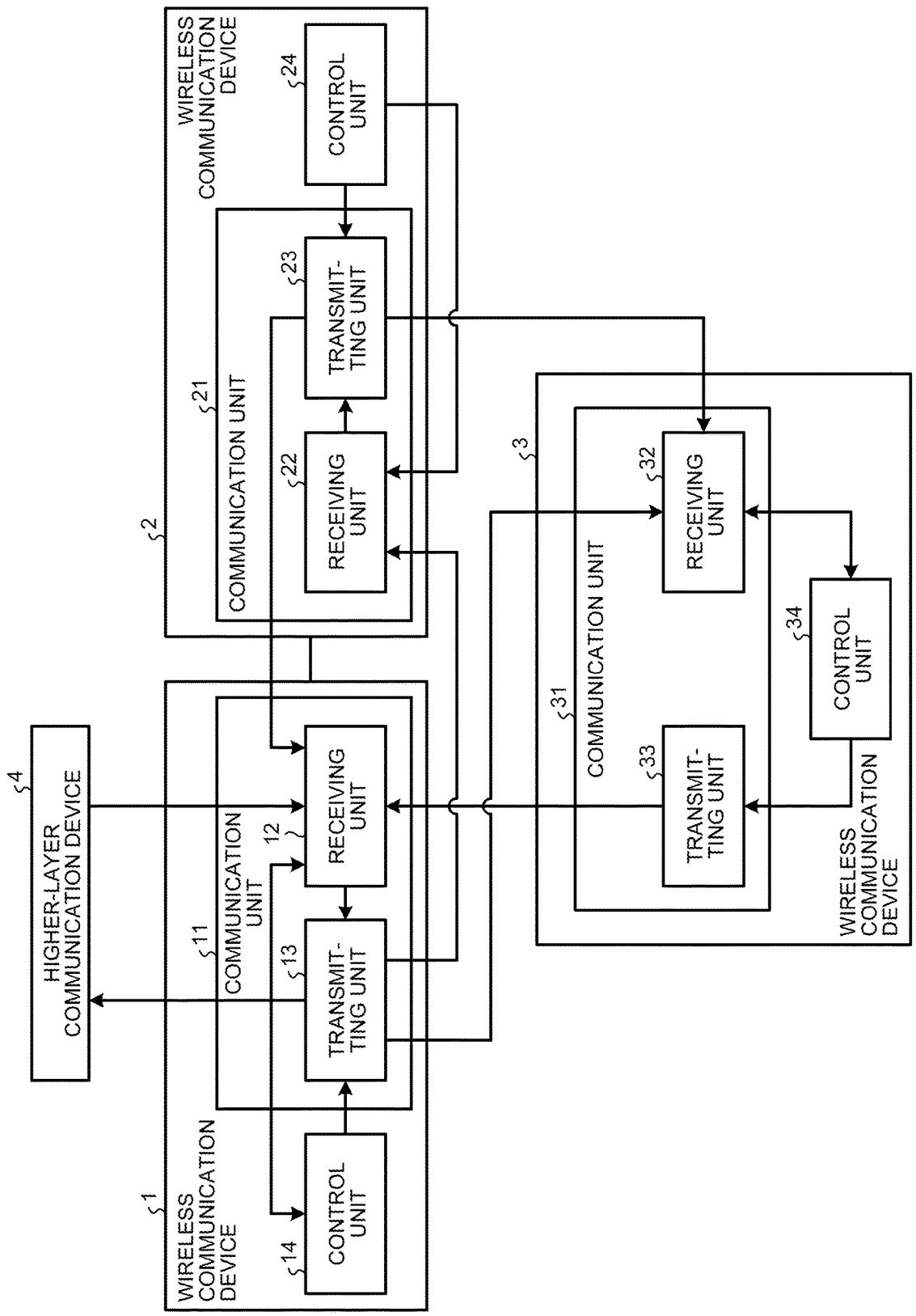
FIG. 1 is a block diagram of a wireless communication system according to a first embodiment.

Hereinafter, embodiments of a wireless communication system, a mobile station, a base station, and a wireless communication method disclosed in the present application will be described in detail based on the drawings. Incidentally, the wireless communication system, the mobile station, the base station, and the wireless communication method disclosed in the present application are not limited by the embodiments below.

First Embodiment

First, a method of realizing dual connectivity will be briefly described. Carrier aggregation (CA) that is a technique defined in a conventional LTE system will be discussed. The carrier aggregation is to realize high-speed/large-capacity communication by using aggregated component carriers (CC) or cells that are frequency bands used for communication between a wireless base station and a wireless terminal. The bandwidth supported by the LTE system is limited to 20 MHz at the maximum; however, due to introduction of the carrier aggregation, it becomes possible to use a bandwidth of 40 MHz by aggregating two CCs of 20 MHz, for example.

In the framework of the carrier aggregation, it seems possible to realize the dual connectivity by, for example, causing a macrocell to use one CC and causing a small cell to use another CC. However, it is considered difficult to realize the dual connectivity based on the carrier aggregation for reasons as described below.

Here, the carrier aggregation is considered from the perspective of a protocol stack in an LTE system. The protocol stack in the LTE system includes, in order from the lowest layer, a PHY layer, a MAC layer, an RLC layer, and a PDCP layer (higher-level layers are also provided, but are omitted herein). As correspondence with a commonly-used open-systems interconnection (OSI) reference model, the PHY layer in the LTE system corresponds to a physical layer that is the first layer of the OSI reference model. Further, the MAC layer, the RLC layer, and the PDCP layer in the LTE system correspond to a data link layer that is the second layer of the OSI reference model. The MAC layer is responsible for a scheduler function or the like, the RLC layer is responsible for sequence control or the like, and the PDCP layer is responsible for security or the like.

If the carrier aggregation is viewed from the perspective of the protocol stack, transmission data is split in the physical layer. Further, reception data is integrated in the physical layer. This means that, in the carrier aggregation, there are a plurality of entities in the physical layer and there is a single entity in a higher-level layer, such as the MAC layer, in both of a transmission side and a reception side. Here, the entity is a term that means a logical (or virtual) processing subject. The entity exists in each of the layers of the protocol stack, and does not always have a one-to-one correspondence with an apparatus that is a physical processing subject, but may have an N-to-one correspondence. For example, according to the carrier aggregation as described above, there are a plurality of entities in the physical layer in both of a transmission side and a reception side.

Incidentally, in the protocol stack for general data communication in the LTE system, entities in the PHY layer, the MAC layer, the RLC layer, and the PDCP layer operate in one serial line in each of the wireless base station and the wireless terminal.

In contrast, in data communication based on the carrier aggregation in the LTE system, entities in the PHY layer, the MAC layer, the RLC layer, and the PDCP layer operate in each of the wireless base station and the wireless terminal. However, the data communication based on the carrier aggregation differs from the general data communication in the LTE system in that only the physical layer is split into two entities. In this manner, if the carrier aggregation is viewed from the perspective of the protocol stack, transmission data is split in the PHY layer and reception data is integrated in the PHY layer.

Meanwhile, as described above, the MAC layer in the LTE system is responsible for the scheduler function. The scheduler function is a function to determine what data is transmitted at which timing and at which frequency. As described above, a single entity exists in the MAC layer in the carrier aggregation, and this means that there is a single scheduler.

If the dual connectivity is to be realized by the carrier aggregation, for example, a MAC entity (scheduler) that exists in a macro wireless base station performs scheduling on PHY entities (CCs) that exist in each of the macro wireless base station and a small wireless base station. This can hardly be realized because of a latency issue in communication between wireless base stations. This is because the scheduling in the LTE system needs to be performed with an extremely short period in units of 1 millisecond (1 subframe). Therefore, in the carrier aggregation, it is possible to cause a single wireless base station to perform transmission and reception by using a plurality of carriers, but it is not practical to cause a plurality of wireless base stations to perform transmission and reception by using a plurality of carriers. In view of the above, it may be extremely difficult to realize the dual connectivity based on the carrier aggregation.

Incidentally, based on the consideration on the carrier aggregation as described above, to realize the dual connectivity, data is split in a data link layer above the physical layer. As described above, in the LTE system, the data link layer is divided into three layers of the MAC layer, the RLC layer, and the PDCP layer. For example, if data is split in the MAC layer, a plurality of entities exist in the MAC layer. Accordingly, a plurality of schedulers are provided, so that it becomes possible to provide different schedulers to the macro wireless base station and the small wireless base station, for example. Therefore, by splitting data in the MAC layer, it becomes possible to avoid the above-described issue based on the latency in communication between wireless base stations, and the dual connectivity can be realized. Similarly, it is possible to realize the dual connectivity when data is split in the RLC layer or the PDCP layer.

Incidentally, data splitting in the data link layer is not equivalent to the dual connectivity. This is because, as in the case where a single wireless base station has a plurality of MAC entities, single connectivity may be realized even when data is split in the data link layer.

Next, with reference to FIG. 1, a wireless communication system according to a first embodiment will be described. FIG. 1 is a block diagram of the wireless communication system according to the first embodiment. As illustrated in FIG. 1, the wireless communication system according to the embodiment includes a wireless communication device 1, a wireless communication device 2, a wireless communication device 3, and a higher-layer communication device 4.

The wireless communication device 1 and the wireless communication device 2 implement dual connectivity. The wireless communication device 1 is a primary wireless communication device in the dual connectivity, and the wireless communication device 2 is a secondary wireless communication device in the dual connectivity.

The wireless communication device 1 and the wireless communication device 2 are connected by wire, for example. The wireless communication device 1 and the wireless communication device 2 transmit and receive data to and from each other by using a wired link connecting between them. Further, the wireless communication device 1, the wireless communication device 2, and the wireless communication device 3 are wirelessly connected.

The wireless communication device 1 includes a communication unit 11 including a receiving unit 12 and a transmitting unit 13, and includes a control unit 14.

The receiving unit 12 receives control data and user data from the higher-layer communication device 4. The receiving unit 12 outputs the received control data and the received user data to the transmitting unit 13. The control data may be data generated by the wireless communication device 1.

Further, the receiving unit 12 receives data related information (for example, information related to data, such as information indicating a retention amount of data in a buffer or a data reception state) held by a receiving unit 32 of the wireless communication device 3, from a transmitting unit 33 of the wireless communication device 3. Then, the receiving unit 12 outputs the data related information received from the transmitting unit 33 to the control unit 14.

The transmitting unit 13 transmits the control data to the receiving unit 32 of the wireless communication device 3. Further, the transmitting unit 13 receives, from the control unit 14, a notification of an amount of data to be delivered to the wireless communication device 2. Then, the transmitting unit 13 transmits data corresponding to the amount of data to be delivered, which is notified by the control unit 14, to the wireless communication device 2 via the wired link.

The control unit 14 integrally controls operations of the communication unit 11 including the receiving unit 12 and the transmitting unit 13. Further, the control unit 14 receives the data related information held by the receiving unit 32 of the wireless communication device 3 from the receiving unit 12. Then, the control unit 14 determines an amount of data to be delivered to the wireless communication device 2 by using the data related information received from the receiving unit 12. Thereafter, the control unit 14 notifies the transmitting unit 13 of the determined amount of data to be delivered to the wireless communication device 2.

The wireless communication device 2 includes a communication unit 21 including a receiving unit 22 and a transmitting unit 23, and includes a control unit 24.

The receiving unit 22 receives data from the transmitting unit 13 of the wireless communication device 1 via the wired link. Then, the receiving unit 22 outputs the received data to the transmitting unit 23.

The transmitting unit 23 receives input of data from the receiving unit 22. Then, the transmitting unit 23 transmits the received data to the receiving unit 32 of the wireless communication device 3.

The control unit 24 integrally controls operations of the communication unit 21 including the receiving unit 22 and the transmitting unit 23.

The wireless communication device 3 includes a communication unit 31 including the receiving unit 32 and the transmitting unit 33, and includes a control unit 34.

The receiving unit 32 receives data from the transmitting unit 23 of the wireless communication device 2. Then, the receiving unit 32 transmits the data related information held therein (for example, information related to data, such as information indicating a retention amount of data in a buffer or a data reception state) to the control unit 34.

The transmitting unit 33 receives the data related information held by the receiving unit 32 from the control unit 34. Then, the transmitting unit 33 transmits the data related information held by the receiving unit 32 to the receiving unit 12 of the wireless communication device 1.

The control unit 34 integrally controls operations of the communication unit 31 including the receiving unit 32 and the transmitting unit 33. Further, the control unit 34 acquires the data related information held by the receiving unit 32. Then, the control unit 34 transmits the data related information held by the receiving unit 32 to the transmitting unit 33.

Figure 2:
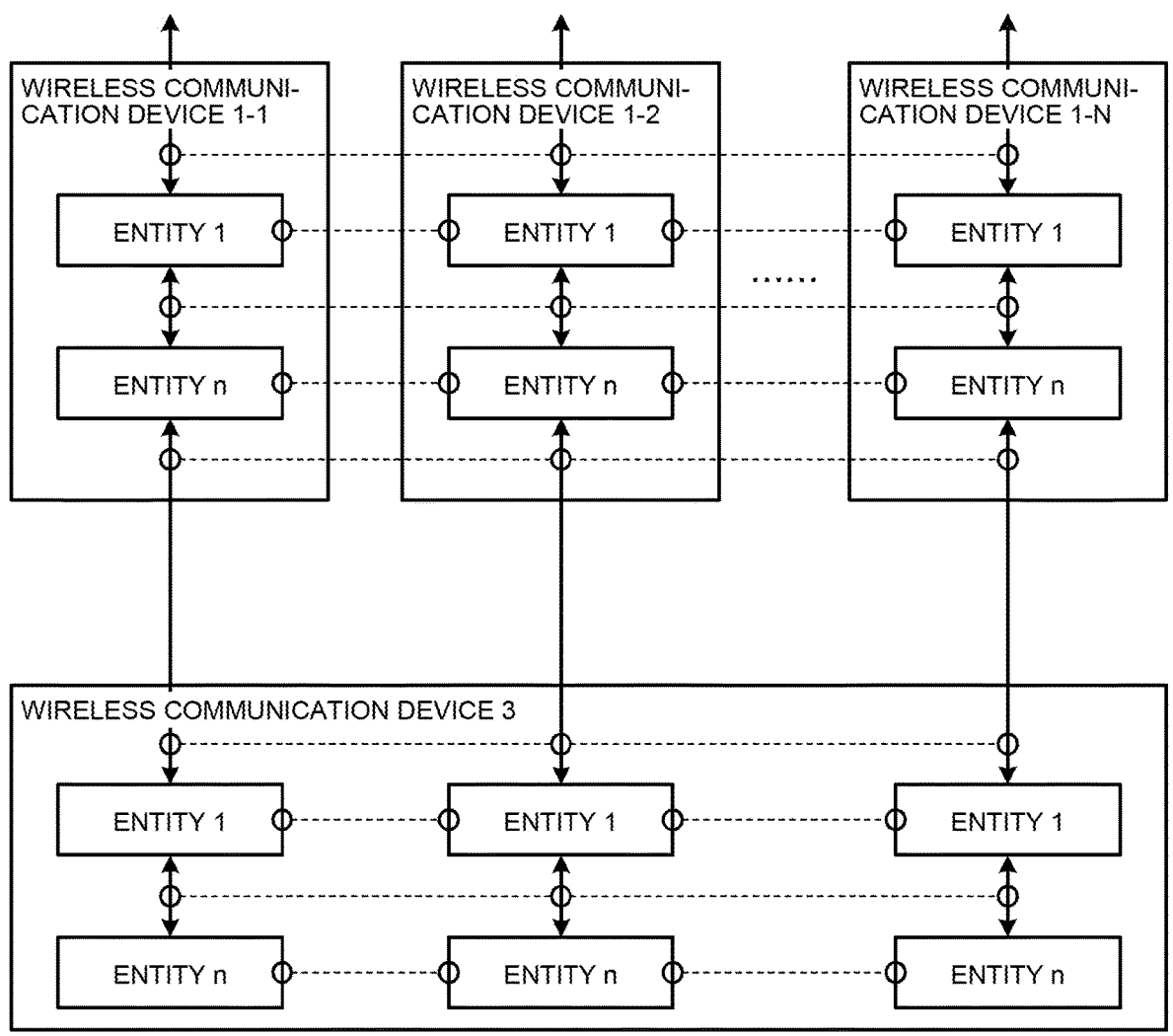
FIG. 2 is a conceptual diagram collectively illustrating various configurations of the wireless communication system.

FIG. 2 is a conceptual diagram collectively illustrating various configurations of the wireless communication system. Wireless communication devices 1-1 to 1-N in FIG. 2 correspond to the wireless communication devices 1 to 3 in FIG. 1. As illustrated in FIG. 2, it is possible to separate the flow of data at each entity or any point before and after the entity to realize the dual connectivity, and in each case, the wireless communication system according to the embodiment can be applied appropriately. Further, as illustrated in FIG. 2, the wireless communication system according to the embodiment can be applied regardless of uplink communication or downlink communication.

As described above, in the wireless communication system according to the embodiment, the wireless communication device 3, such as a mobile station, notifies the wireless communication device 1 of information on a buffer (for example, information related to data, such as information indicating a retention amount of data in the buffer or a data reception state), and the wireless communication device 1 controls an amount of data delivered to the wireless communication device 2, in accordance with the notified information. The wireless communication device 3 and the wireless communication device 1 wirelessly communicate with each other; therefore, the wireless communication system according to the embodiment can send a notice to the wireless communication device 1 that controls the delivery amount at high speed, as compared to a case where the wireless communication device 2 notifies the wireless communication device 1 of information (for example, information related to data, such as information indicating a retention amount of data in a buffer or a data reception state) that can be received via the wired link. Therefore, in the wireless communication system according to the embodiment, the wireless communication device 1 can send data with a more appropriate delivery amount to the wireless communication device 2, as compared to a case where data is transmitted to the wireless communication device 2 by using information received via the wired link. That is, the wireless communication system according to the embodiment can improve efficiency of communication between wireless communication devices.

Second Embodiment

Figure 3:
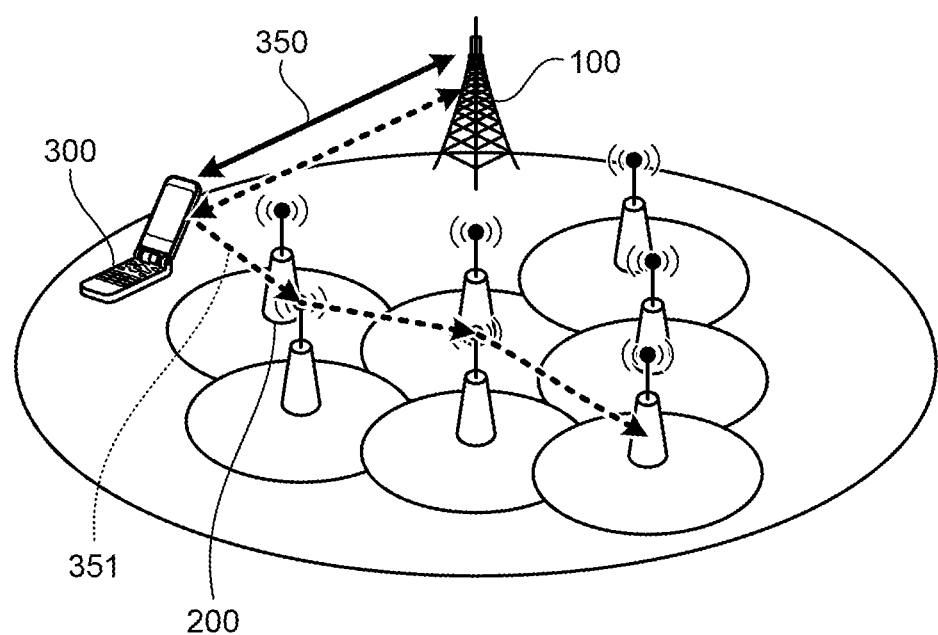
FIG. 3 is a schematic diagram illustrating dual connectivity in a wireless communication system according to a second embodiment.

Next, a second embodiment will be described. FIG. 3 is a schematic diagram illustrating dual connectivity in a wireless communication system according to a second embodiment. The wireless communication system according to the embodiment includes a macro base station 100 as the wireless communication device 1 in FIG. 1. Further, a small base station 200 is provided as the wireless communication device 2 in FIG. 1. Furthermore, a mobile station 300 is provided as the wireless communication device 3 in FIG. 1.

The mobile station 300 connects to the macro base station 100 as a primary base station. The mobile station 300 is connected to the macro base station 100 by a control plane 350 indicated by a solid arrow and a user plane 351 indicated by a dashed arrow. Further, the mobile station 300 connects to the small base station 200 as a secondary base station. The mobile station 300 is connected to the small base station 200 by the user plane 351. The user plane 351 in FIG. 3 indicates each of the user planes 351 that connect the mobile station 300 and the small base station 200 when a handover is performed. The control plane 350 corresponds to an example of a "first logical processing subject". Further, the user plane 351 corresponds to an example of a "second logical processing subject".

The configuration of the wireless communication system as illustrated in FIG. 3 is often employed to reduce the number of times of traffic offload or handovers.

Figure 4:
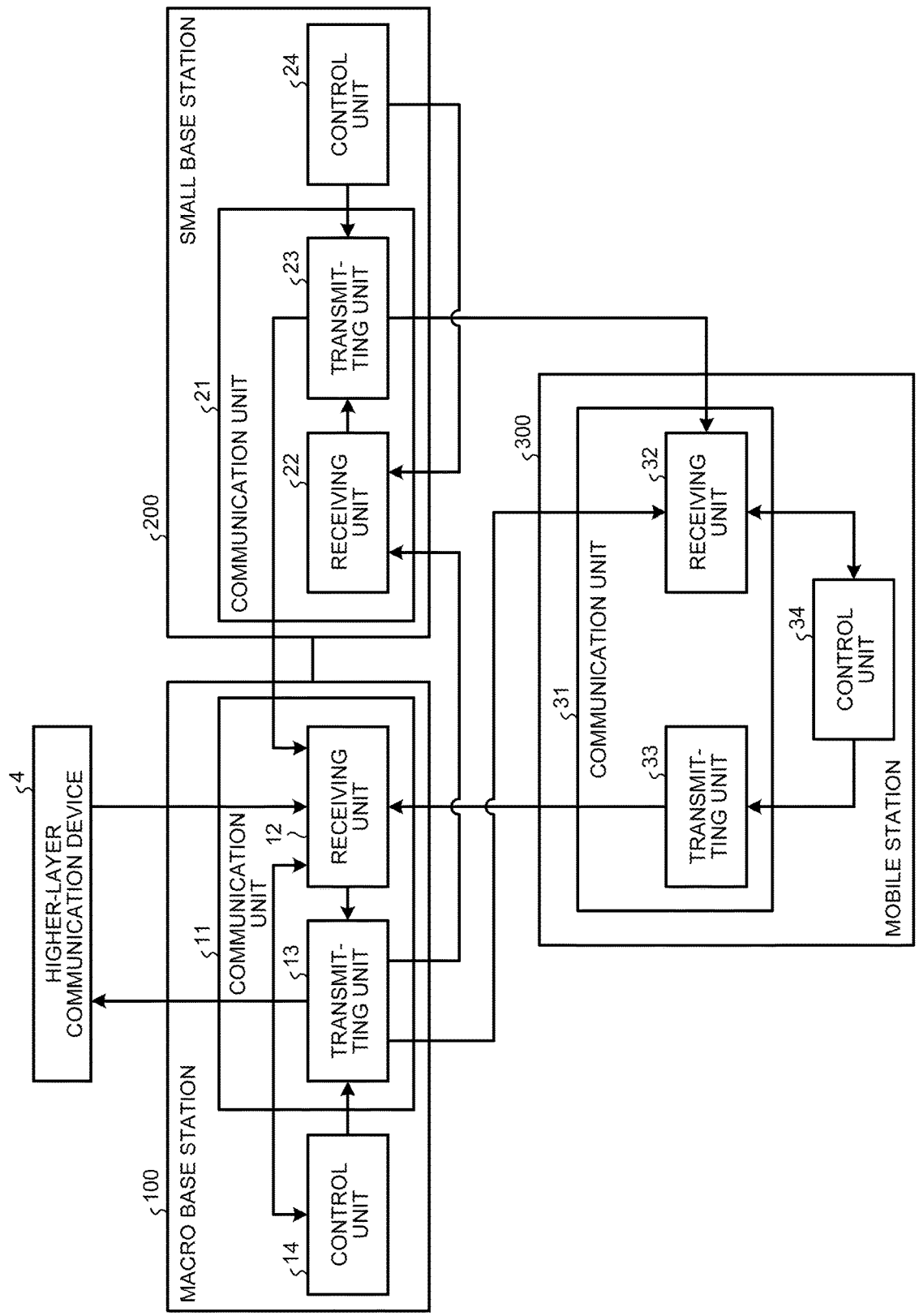
FIG. 4 is a block diagram of the wireless communication system according to the second embodiment.

Next, with reference to FIG. 4, the wireless communication system according to the embodiment will be described in detail. FIG. 4 is a block diagram of the wireless communication system according to the second embodiment. In the wireless communication system according to the embodiment, in FIG. 4, the same components denoted by the same symbols as those in FIG. 1 have the same functions unless otherwise specified.

A macrocell that is a cell of the macro base station 100 includes a plurality of small cells including a cell of the small base station 200. The wireless communication system according to the embodiment implements dual connectivity with the mobile station 300 by employing the macro base station 100 as a primary wireless communication device and the small base station 200 as a secondary wireless communication device.

Further, the macro base station 100, the small base station 200, and the mobile station 300 perform communication by using a link layer protocol corresponding to a plurality of link layers, such as the PDCP layer, the RLC layer, the MAC layer, and the PHY layer.

Figure 5:
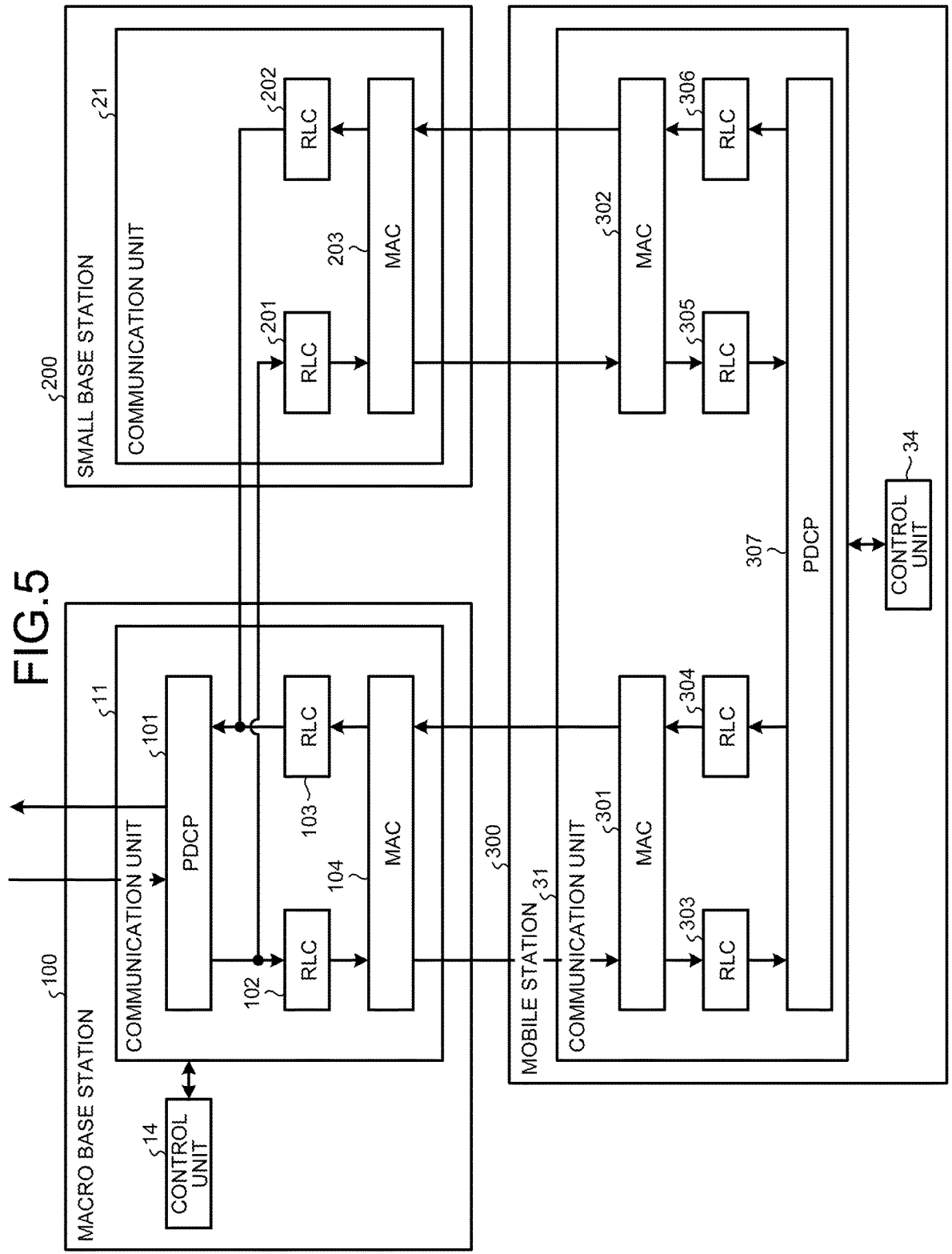
FIG. 5 is a diagram illustrating transmission and reception of user data performed by using each of link layers in the wireless communication system according to the first embodiment.

Herein, with reference to FIG. 5, a process performed for each link layer will be described below. FIG. 5 is a diagram illustrating transmission and reception of user data performed by using each of the link layers in the wireless communication system according to the second embodiment. Incidentally, in the embodiment, a case will be described in which the mobile station 300 acquires user data from each of the macro base station 100 and the small base station 200.

The receiving unit 12 and the transmitting unit 13 in the communication unit 11 of the macro base station 100 transmit and receive data by using the PDCP layer, a downlink RLC layer, the MAC layer, and the PHY layer. In FIG. 5, for convenience of explanation, a PDCP layer 101, an RLC layer 102, an RLC layer 103, and a MAC layer 104 among layers for performing communication by the communication unit 11 are illustrated. The RLC layer 102 is a downlink RLC layer, and the RLC layer 103 is an uplink RLC layer.

Incidentally, this configuration is a configuration in which an RLC acknowledged mode (AM) is used in the RLC layers. In the RLC AM, an interactive bearer (bi-directional bearer) is used (mapped) as a bearer to receive uplink feedback with respect to downlink data (transmission acknowledgement (ACK or NACK) with respect to transmitted data, or communication control information). In the case of uplink communication, similarly, a bi-directional bearer is used (mapped) to receive downlink feedback with respect to uplink data. The bearer may be referred to as an AM-DRB in order to clarify the type of the bearer.

As another configuration of the RLC layer, there is a configuration using an RLC unacknowledged mode (UM). In the RLC UM, there is a case in which a bi-directional bearer is used (mapped) similarly to the RLC AM, and there is another case in which a one-directional (uni-directional) bearer is used. In the case of the uni-directional bearer, a single PDCP layer, a single RLC layer, and a single MAC layer are used (mapped) in each of downlink communication and uplink communication. The bearer may be referred to as a UM-DRB in order to clarify the type of the bearer.

As still another configuration of the RLC layer, there is a configuration using an RLC transparent mode (TM). This configuration is a configuration in which the RLC layer is not substantially used, and data in the PDCP layer is directly delivered to the MAC layer in each of downlink communication and uplink communication.

For example, an application using transmission control protocol (TCP) to provide reliable communication is mapped on the RLC AM. For example, an application using user data gram protocol (UDP) to provide communication requested to have real time characteristics (for example, VoIP) is mapped on the RLC UM.

Further, in the wireless communication system according to the embodiment, the macro base station 100 as the primary wireless communication device separates the data plane between the PDCP layer 101 and the RLC layer 102. Specifically, the data plane is separated between the PDCP layer 101 and the RLC layer 102 such that one goes to the RLC layer 102 of the macro base station 100 and the other goes to an RLC layer 201 of the small base station 200.

(Process by Macro Base Station)

A process performed by the communication unit 11 at the time of transmitting user data to the mobile station 300 will be described.

The communication unit 11 receives pieces of user data of the PDCP layer 101 from the higher-layer communication device 4. Then, the communication unit 11 regularly assigns, in the PDCP layer 101, numbers (for example, sequence numbers in ascending order) to packets of the received pieces of user data. The numbers are also used for a handover. In the embodiment, for example, the communication unit 11 adds odd numbers in sequence to pieces of data to be sent to the RLC layer 102 of own device. Further, the communication unit 11 sequentially adds even numbers to packets of pieces of user data to be sent to the RLC layer 201 of the small base station 200. Furthermore, the communication unit 11 performs header compression, security check, and encryption on the pieces of user data in the PDCP layer 101.

Then, the communication unit 11 transmits the pieces of user data to which the odd numbers are added from the PDCP layer 101 to the RLC layer 102. Further, the communication unit 11 transmits the pieces of user data to which the even numbers are added to the RLC layer 201 of the small base station 200 via the wired link.

Here, with reference to FIG. 6, distribution of user data by the communication unit 11 will be described. FIG. 6 is a diagram for explaining the flow of pieces of user data to which the numbers are regularly assigned. Dotted line rectangles in FIG. 6 represent pieces of delivered user data. Further, numbers in the pieces of user data represent the numbers assigned to the pieces of user data. For example, #1 represents a piece of user data to which the number 1 is assigned.

The communication unit 11 transmits pieces of data to which numbers 1, 3, 5, and 7 are assigned in the PDCP layer 101 to the RLC layer 102 as indicated by an arrow 111. Further, the communication unit 11 transmits pieces of data to which numbers 2, 4, 6, and 8 are assigned in the PDCP layer 101 to the RLC layer 201 of the small base station 200 as indicated by an arrow 112.

Transmission of user data by the communication unit 11 to the RLC layer 201 of the small base station 200 will be described in detail below.

The communication unit 11 receives, from the communication unit 31 of the mobile station 300, a PDCP status report on information indicating a state of a buffer of the mobile station 300 (for example, a retention amount of data and a data reception state). Then, the communication unit 11 transmits the received PDCP status report to the control unit 14. Thereafter, the communication unit 11 receives, from the control unit 14, a notification of an amount of user data to be delivered to the RLC layer 201 of the small base station 200. Then, the communication unit 11 transmits the user data with the delivery amount specified by the control unit 14 to the RLC layer 201 of the small base station 200.

Referring back to FIG. 5, the explanation is continued. The communication unit 11 receives, in the RLC layer 102, pieces of user data (PDCP PDUs) from the PDCP layer. It is possible to divide or integrate packets as the pieces of user data to change sizes of the packets if needed. Further, the communication unit 11 sequentially assigns, in the RLC layer 102, numbers for the RLC layer to the packets (PDCP PDUs) received from the PDCP layer. Then, the communication unit 11 accumulates the packets (RLC PDUs) as the pieces of user data in a buffer of the RLC layer 102.

Thereafter, the communication unit 11 receives, from the MAC layer 104, a data amount of user data that can be transmitted to the mobile station 300. Then, the communication unit 11 transmits pieces of user data corresponding to the data amount received from the MAC layer 104, from the buffer of the RLC layer 102 to the MAC layer 104.

The communication unit 11 assembles, in the MAC layer 104, transmission data by using the pieces of user data (RLC PDUs) received from the RLC layer 102 (for example, generates a MAC PDU by adding a MAC header or the like). Then, the communication unit 11 performs, in the MAC layer 104, scheduling for data transmission, and outputs pieces of assembled data to the mobile station 300 in accordance with the schedule. Incidentally, FIG. 5 illustrates that the MAC layer 104 of the communication unit 11 and a MAC layer 301 of the mobile station 300 communicate with each other; however, in reality, communication is performed via a PHY layer or the like.

Next, a process performed by the communication unit 11 at the time of receiving user data from the mobile station 300 will be described.

The communication unit 11 performs, in the MAC layer 104, scheduling for user data reception, and receives pieces of user data from the MAC layer 301 of the mobile station 300 in accordance with the scheduling. Subsequently, the communication unit 11 reconstructs (reassembles) the received pieces of user data in the MAC layer 104 (for example, removes an MAC header and extracts an RLC PDU from a MAC PDU). Then, the communication unit 11 transmits (delivers) the pieces of user data (MAC SDUs) from the MAC layer 104 to the RLC layer 103.

The communication unit 11 divides or integrates the received pieces of user data (RLC PDUs) in the RLC layer 103. Further, the communication unit 11 corrects, in the RLC layer 103, the order of the packets by using the numbers for the RLC layer added to the packets. Then, the communication unit 11 transmits (delivers) the pieces of user data (RLC SDUs) in order of the sequence numbers, from the RLC layer 103 to the PDCP layer 101.

The communication unit 11 performs decoding, security check, and header decompression on the pieces of user data (PDCP PDUs) in the PDCP layer 101.

Then, the communication unit 11 transmits the pieces of user data from the PDCP layer 101 to the higher-layer communication device 4.

Further, if a handover occurs, the communication unit 11 releases multiple connectivity, and shifts to communication using only single connectivity. Then, the communication unit 11 acquires, in the PDCP layer 101, packets contained in the lower layer, such as the RLC layer, from the lower layer. Then, the communication unit 11 rearranges, in the PDCP layer 101, the acquired packets in numerical order to guarantee the numbers.

If a handover occurs, a base station operating before move forwards (transfers) packets that have not been transmitted to a base station that operates after the move. Then, the base station that operates after the move transmits the packet received by the forwarding to the mobile station 300.

Next, operations of the control unit 14 will be described. The control unit 14 notifies the mobile station 300 of a parameter setting for the PDCP status report to notify the state of the buffer of the mobile station 300 (for example, a retention amount of data and a data reception state) via the communication unit 11. Here, the parameter setting for the PDCP status report includes a notification cycle, a threshold for the retention amount to determine whether to send a notification, and the like. In the embodiment, the control unit 14 stores, as the threshold for the retention amount, 10% of the buffer of a PDCP layer 307 of the mobile station 300. Further, in the embodiment, the control unit 14 stores 100 ms as the notification cycle. However, the threshold for the retention amount and the notification cycle may be set to other values, and it is preferable to determine them according to operations.

Figure 7A:
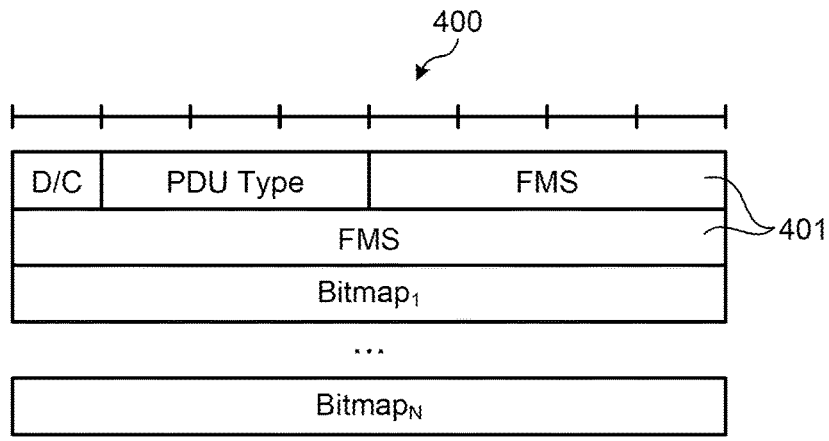
FIG. 7A is a diagram illustrating an example of a PDCP status report for a 12-bit sequence number.
Figure 7B:
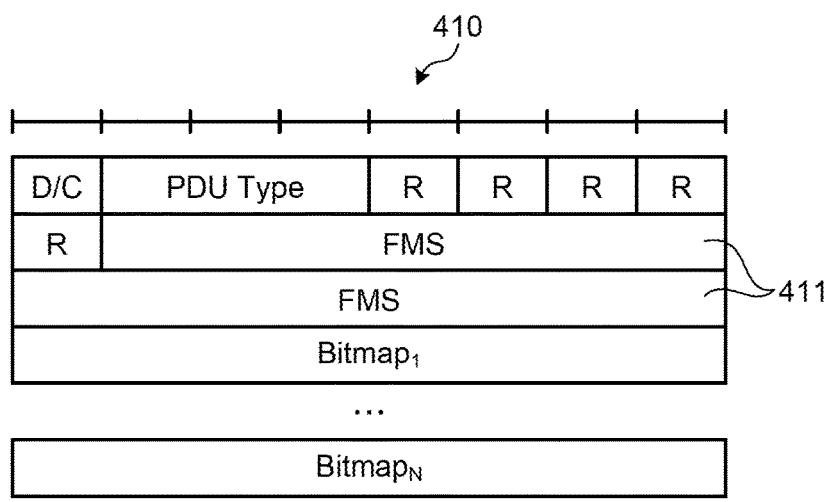
FIG. 7B is a diagram illustrating an example of a PDCP status report for a 15-bit sequence number.
Figure 7C:
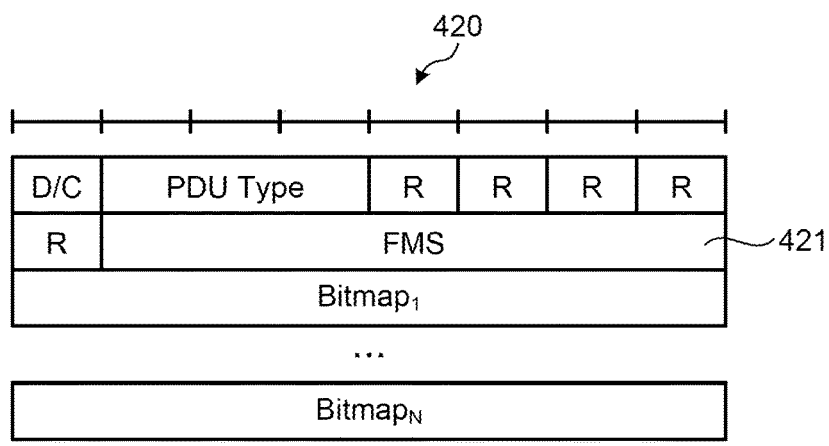
FIG. 7C is a diagram illustrating an example of a PDCP status report for a 7-bit sequence number.

Then, after wireless communication with the dual connectivity starts, the control unit 14 receives the PDCP status report of the mobile station 300 from the communication unit 11. FIG. 7A is a diagram illustrating an example of a PDCP status report for a 12-bit sequence number. Further, FIG. 7B is a diagram illustrating an example of a PDCP status report for a 15-bit sequence number. FIG. 7C is a diagram illustrating an example of a PDCP status report for a 7-bit sequence number. In the PDCP status report, the size of a sequence number is different depending on data to be transmitted and received. For example, in voice over internet protocol (VoIP) or the like, a 7-bit sequence number may be used.

In each of PDCP status reports 400, 410, and 420, the size of a first missing sequence number (FMS) 401, 411, or 421 is different, which represents a sequence number of the oldest packet among packets that have not arrived. In the following, the PDCP status report for a 12-bit sequence number illustrated in FIG. 7A will be described as an example.

A format of the PDCP status report 400 illustrated in FIG. 7A is used such that the mobile station notifies the base station of the PDCP sequence numbers. The FMS 401 stores therein a PDCP sequence number of the oldest packet among the packets that have not arrived. Incidentally, the PDCP status report 400 corresponds to a 12-bit PDCP sequence number; therefore, the FMS 401 uses 12 bits. Further, $Bitmap_1$ to $Bitmap_N$ are used as options.

In the FMS 401, the sequence number of the oldest packet among the packets that have not arrived is stored. In other words, the FMS 401 stores therein the sequence number of the packet to be received first among the packets of the pieces of user data that have not arrived from the small base station 200. In the following, the oldest packet among the packets that have not arrived may be referred to as an "FMS packet". Further, in the Bitmap$_1$ to the Bitmap$_N$ of the PDCP status report 400, information indicating arrival states of packets that follow the packet corresponding to the FMS 401 is stored. In the embodiment, information in which a bit of "1" indicates arrival and a bit of "0" indicates non-arrival is stored in the Bitmap$_1$ to the Bitmap$_N$ of the PDCP status report 400. For example, when a certain packet has not arrived, and if arrival and non-arrival are alternately repeated for subsequent six packets, information of 101010 is stored in the Bitmap$_1$ to the Bitmap$_N$.

Figures 8, 9:
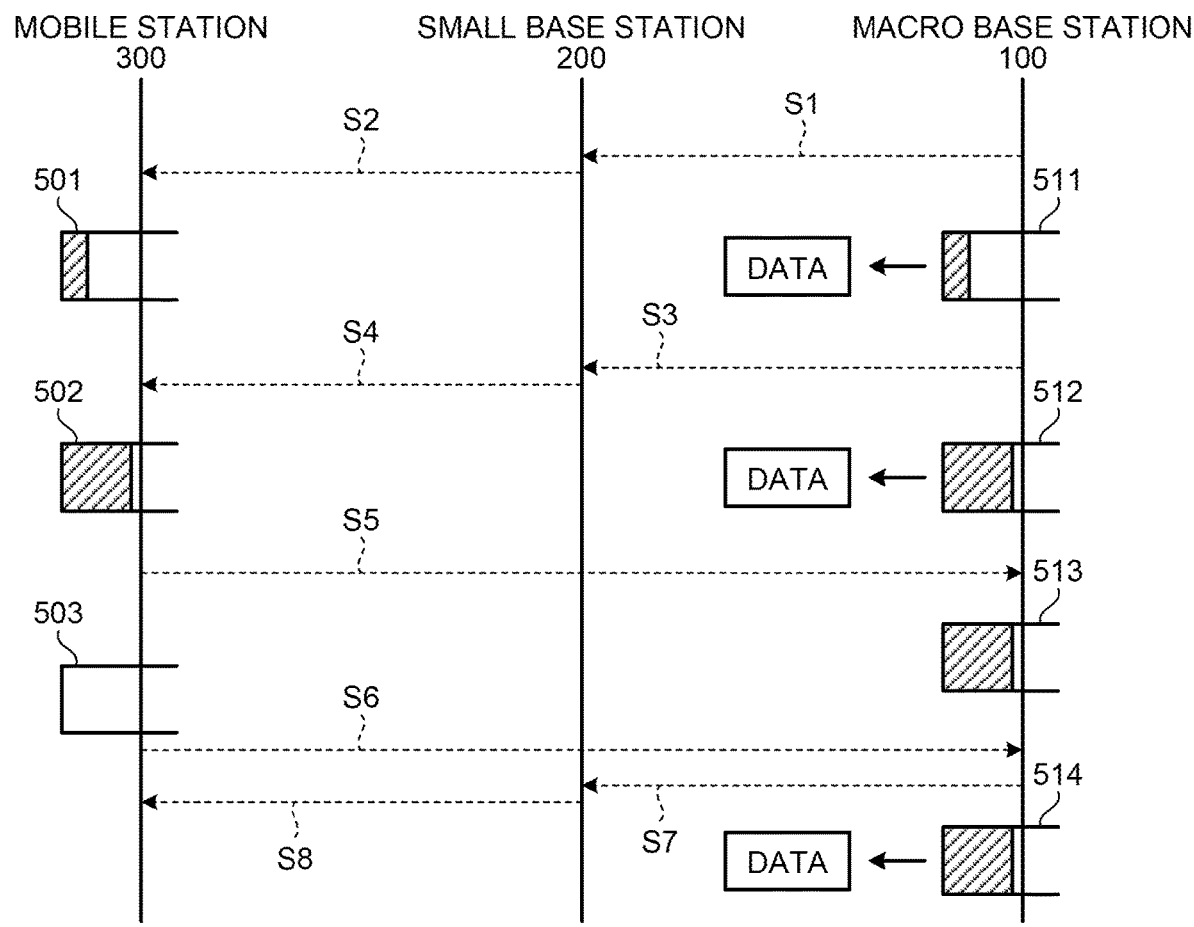
FIG. 8 is a diagram illustrating information stored in a PDU Type.
FIG. 9 is a sequence diagram for explaining the overall flow to control a delivery amount of data.

Further, FIG. 8 is a diagram illustrating information stored in a PDU type. In a table 430, information on each bit in a PDU type of the PDCP status report and contents of the corresponding PDU Type are written. If each bit in the PDU Type is "000", this indicates a PDCP status report on the PDCP sequence number of the user data received by the mobile station 300. Further, if each bit in the PDU Type is "001", this indicates an interspersed robust header compression feedback packet (interspersed ROHC feedback packet). The interspersed ROHC feedback packet includes feedback information on a PDCP PDU transferred from a reception side. Further, each of bits of "010" to "111" in the PDU Type is retained as a backup. In the embodiment, a bit sequence of "001" is stored in the PDU Type of the PDCP status report 400.

However, it is possible to specify a new different value as a PDU type to indicate notification of information on the state of the buffer (for example, a retention amount of data and a data reception state). For example, it may be possible to store, in the bit sequence in the PDU Type, a value that is determined in advance from among "010" to "111" as each bit.

Incidentally, in the embodiment, as illustrated in FIG. 7C, the PDCP status report 420 for a 7-bit sequence number is generated. Therefore, in the wireless communication system according to the embodiment, even when an RLC unacknowledged mode (UM) bearer is used, it is possible to use the PDCP status report, enabling to improve the reliability to guarantee the order of the packets.

The control unit 14 acquires the number assigned to an FMS packet from the FMS 401 of the received PDCP status report 400. Further, the control unit 14 acquires reception states of packets following the FMS packet from the Bitmap$_1$ to the Bitmap$_N$ of the PDCP status report 400. Further, the control unit 14 acquirers a retention amount of data in the buffer of the mobile station 300 from the amount of packets following the packet with the number stored in the FMS 401.

Thereafter, the control unit 14 notifies the communication unit 11 of the obtained state of the buffer.

Incidentally, a case will be described, as an example, in which the sequence numbers are assigned to the packets of the pieces of user data as illustrated in FIG. 6. For example, it is assumed that a packet with a sequence number of 2 in FIG. 6 has not arrived at the mobile station 300.

In this case, packets with the odd sequence numbers are transmitted from the macro base station 100, so that the packets with the sequence numbers 1, 3, 5, and 7 arrive at the mobile station 300. In contrast, packets with the even sequence numbers are transmitted from the small base station 200, so that the packets with the sequence numbers 4, 6, and 8 following the number 2 do not arrive at the mobile station 300. This is because if the packet with the number 2 has not arrived at the PDCP layer, the packets with the subsequent numbers are retained in the lower layer and do not arrive at the PDCP layer.

However, in the case of a handover, even if the packet with the number 2 has not arrived at the PDCP layer, the packets with the sequence numbers 4, 6, and 8 are forwarded to the PDCP layer. Then, in the PDCP layer, the numbers assigned to the packets are guaranteed.

Incidentally, by assuming the worst case, it may be possible to apply the operation at the time of a handover to the case of the dual connectivity (multiple connectivity). That is, in the case where the second packet is not delivered from the macro base station to the small base station (for example, a case where a packet loss occurs or a bit error is detected by the small base station side), the packets with the sequence numbers 4, 6, and 8 are not forwarded to the PDCP layer but remain in states like a deadlock. In this case, end-to-end retransmission is performed in a higher-level layer, such as a TCP layer or an application layer.

Therefore, even if a sequence number is lost, by forwarding the packets to the PDCP layer, it is possible to recognize, in the PDCP layer, which of the packets has not arrived. For example, in the above-described example, if the packet with the sequence number 2 has not arrived at the PDCP layer, the state of the buffer of the PDCP layer indicates "1, 3, 4, 5, 6, 7, 8", and it is found that the packet 2 has not arrived. If the packet 2 has not been delivered to the small base station as described above, the deadlock state occurs as described above. Therefore, to resolve this state, timer control may be employed.

Specifically, for example, if it is detected that the packet with the sequence number 2 has not arrived, a timer is started. Then, if the second packet has not arrived within a set time and the timer expires, it is determined that the packet 2 has not arrived at the small base station, and all of the packets are forwarded to the higher-level layer.

Through the control as described above, it becomes possible to resolve the deadlock state as soon as possible, and increase the speed of end-to-end retransmission (to reduce a delay time before retransmission).

Incidentally, a setting value of the timer may be set in advance at the time of setting a line, or may be set at the time of implementing the dual connectivity (multiple connectivity). Further, the timer may be managed by the PDCP layer, or by a different layer (the MAC layer or the RLC layer). What is important is to control the timer by the terminal.

In this case, the control unit 14 receives a PDCP status report, in which information on the sequence number 2 is stored in the FMS and information indicating "101010" is stored in the Bitmap$_1$ to the Bitmap$_N$. Then, the control unit 14 acquires the number 2 stored in the FMS as the number assigned to the FMS packet. Then, the control unit 14 confirms, from the bit sequence, that the packets with the sequence numbers 3, 5, and 7 are accumulated in the buffer of the mobile station 300 but the packets with the sequence numbers 4, 6, and 8 have not arrived from the small base station 200. The packets with the sequence numbers 3, 5, and 7 accumulated in the buffer of the mobile station 300 and the packets with the sequence numbers 2, 4, 6, and 8 that have not arrived from the small base station 200 correspond to the retention amount of data in the buffer of the mobile station 300. Then, the control unit 14 calculates a delivery amount of user data transmitted from the macro base station 100 to the small base station 200 by using the retention amount of data in the buffer of the mobile station 300.

As for a calculation of the delivery amount of data, for example, the control unit 14 may store therein, in advance, a function such that the delivery amount is reduced with an increase in the retention amount of data and the delivery amount is increased with a decrease in the retention amount of data, and may calculate the delivery amount by using the function. Further, the delivery amount for transmission of data may be fixed, and the control unit 14 may stop delivery of data when the retention amount of data is greater than a predetermined threshold, and thereafter, may resume the delivery of data when the retention amount of data falls below the threshold. Further, it may be possible to store correspondence between the retention amount of data and the delivery amount in a stepwise manner, and the control unit 14 may determine the delivery amount in accordance with the stored correspondence relationship.

The control unit 14 stores the sequence number assigned to each of packets transmitted to the macro base station 100 and the small base station 200; therefore, it is possible to calculate the retention amount of data on the small base station side on the basis of the received PDCP status report, so that it is possible to calculate the delivery amount of data.

(Process by Small Base Station)

Referring back to FIG. 5, the explanation is continued. A process performed by the small base station 200 at the time of transmitting user data to the mobile station 300 will be described. In FIG. 5, only the RLC layer 201, an RLC layer 202, and a MAC layer 203 used for the explanation are illustrated among the layers of the small base station 200. Incidentally, the RLC layer 201 is a downlink RLC layer, and the RLC layer 202 is an uplink RLC layer (the RLC layer associated with downlink).

The communication unit 21 receives, in the RLC layer 201, pieces of user data transmitted from the PDCP layer 101 of the macro base station 100 via the wired link.

Subsequently, the communication unit 21 receives, in the RLC layer 201, pieces of user data (PDCP PDUs) from the PDCP layer. The communication unit 21 may divide or integrate packets as the pieces of user data to change sizes of the packets if needed. Further, the communication unit 21 sequentially assigns, in the RLC layer 201, numbers for the RLC layer to the packets (PDCP PDUs) received from the PDCP layer. Then, the communication unit 21 accumulates the packets (RLC PDUs) as the pieces of user data in the buffer of the RLC layer 201.

Thereafter, the communication unit 21 receives, from the MAC layer 203, a data amount of user data that can be transmitted to the mobile station 300. Then, the communication unit 21 transmits pieces of user data corresponding to the data amount received from the MAC layer 203, from the buffer of the RLC layer 201 to the MAC layer 203.

The communication unit 21 assembles, in the MAC layer 203, transmission data by using the pieces of user data (RLC PDUs) received from the RLC layer 201 (for example, generates a MAC PDU by adding a MAC header or the like). Then, the communication unit 21 performs, in the MAC layer 203, scheduling for data transmission, and outputs pieces of assembled data (RLC SDUs) to the mobile station 300 in accordance with the schedule.

Next, a process performed by the small base station 200 at the time of receiving user data from the mobile station 300 will be described.

The communication unit 21 performs, in the MAC layer 203, scheduling for user data reception, and receives pieces of user data from a MAC layer 302 of the mobile station 300 in accordance with the scheduling. Subsequently, the communication unit 21 reconstructs (reassembles) the received pieces of user data in the MAC layer 203. Then, the communication unit 21 transmits (delivers) the pieces of user data (MAC SDUs) from the MAC layer 203 to the RLC layer 202.

The communication unit 21 divides or integrates the received pieces of user data (RLC PDUs) in the RLC layer 202. Further, the communication unit 21 corrects, in the RLC layer 202, the order of the packets by using the numbers for the RLC layer added to the packets. Then, the communication unit 21 transmits (delivers) the pieces of user data (RLC SDUs) in order of the sequence numbers, from the RLC layer 202 to the PDCP layer 101 of the macro base station 100 via the wired link.

(Process by Mobile Station)

Next, the mobile station 300 will be described. In FIG. 5, the MAC layer 301, the MAC layer 302, RLC layers 303 to 306, and the PDCP layer 307 used for the explanation are illustrated among the layers of the mobile station 300. Incidentally, in the embodiment, the mobile station 300 has a function to receive pieces of data from two base stations in parallel. The MAC layer 301, the RLC layer 303, the RLC layer 304, and the PDCP layer 307 are layers for transmitting and receiving data to and from the macro base station 100. The RLC layer 303 is a downlink RLC layer, and the RLC layer 304 is an uplink RLC layer. Further, the MAC layer 302, the RLC layer 305, the RLC layer 306, and the PDCP layer 307 are layers for transmitting and receiving data to and from the small base station 200. The RLC layer 305 is a downlink RLC layer, and the RLC layer 306 is an uplink RLC layer (the RLC layer associated with downlink).

A process performed by the mobile station 300 at the time of receiving user data from the macro base station 100 will be described.

The communication unit 31 performs, in the MAC layer 301, scheduling for user data reception, and receives pieces of user data from the MAC layer 104 of the macro base station 100 in accordance with the scheduling. Subsequently, the communication unit 31 reconstructs (reassembles) the received pieces of user data in the MAC layer 301. Then, the communication unit 31 transmits the pieces of user data (MAC SDUs) from the MAC layer 301 to the RLC layer 303.

The communication unit 31 divides or integrates the received pieces of user data (RLC PDUs) in the RLC layer 303. Further, the communication unit 31 corrects, in the RLC layer 303, the order of the packets by using the numbers for the RLC layer added to the packets. Then, the communication unit 31 transmits (delivers) the pieces of user data (RLC SDUs) in order of the sequence numbers, from the RLC layer 303 to the PDCP layer 307.

The communication unit 31 performs, in the PDCP layer 307, decoding, security check, and header decompression on the pieces of user data.

Then, the communication unit 31 performs data processing, such as display of the pieces of data or calculations using the pieces of data, on the received pieces of user data.

Next, a process performed by the mobile station 300 at the time of transmitting user data to the macro base station 100 will be described.

The communication unit 31 regularly assigns, in the PDCP layer 307, numbers (for example, sequence numbers in ascending order) to packets of pieces of user data to be transmitted. Further, the communication unit 31 performs header compression, security check, and encryption on the pieces of user data in the PDCP layer 307.

Then, the communication unit 31 transmits the pieces of user data from the PDCP layer 307 to the RLC layer 304.

Subsequently, the communication unit 31 receives, in the RLC layer 304, pieces of user data (PDCP PDUs) from the PDCP layer. The communication unit 31 may divide or integrate packets as the pieces of user data to change sizes of the packets if needed. Further, the communication unit 31 sequentially assigns, in the RLC layer 304, numbers for the RLC layer to the packets (PDCP PDUs) received from the PDCP layer. Then, the communication unit 31 accumulates the packets (RLC PDUs) as the pieces of user data in a buffer of the RLC layer 304.

Thereafter, the communication unit 31 receives, from the MAC layer 301, a data amount of user data that can be transmitted to the macro base station 100. Then, the communication unit 31 transmits pieces of user data corresponding to the data amount received from the MAC layer 301, from the buffer of the RLC layer 304 to the MAC layer 301.

The communication unit 31 assembles, in the MAC layer 301, transmission data by using the pieces of user data (RLC PDUs) received from the RLC layer 304 (for example, generates a MAC PDU by adding a MAC header or the like). Then, the communication unit 31 performs, in the MAC layer 301, scheduling for data transmission, and outputs pieces of assembled data to the macro base station 100 in accordance with the schedule.

A process performed by the mobile station 300 at the time of receiving user data from the small base station 200 will be described.

The communication unit 31 performs, in the MAC layer 302, scheduling for user data reception, and receives pieces of user data from the MAC layer 203 of the small base station 200 in accordance with the scheduling. Subsequently, the communication unit 31 reconstructs (reassembles) the received user data in the MAC layer 302. Then, the communication unit 31 transmits (delivers) the pieces of user data (MAC SDUs) from the MAC layer 302 to the RLC layer 305.

The communication unit 31 divides or integrates the received pieces of user data (RLC PDUs) in the RLC layer 305. Further, the communication unit 31 corrects, in the RLC layer 305, the order of the packets by using the numbers for the RLC layer added to the packets. Then, the communication unit 31 transmits (delivers) the pieces of user data (RLC SDUs) in order of the sequence numbers, from the RLC layer 305 to the PDCP layer 307.

The communication unit 31 performs, in the PDCP layer 307, decoding, security check, and header decompression on the pieces of user data (PDCP PDUs).

Then, the communication unit 31 performs data processing, such as display of the pieces of data or calculations using the pieces of data, on the received pieces of user data.

Next, a process performed by the mobile station 300 at the time of transmitting user data to the small base station 200 will be described.

The communication unit 31 regularly assigns, in the PDCP layer 307, numbers (for example, sequence numbers in ascending order) to packets of pieces of user data to be transmitted. Further, the communication unit 31 performs header compression, security check, and encryption on the pieces of user data in the PDCP layer 307.

Then, the communication unit 31 transmits the pieces of user data from the PDCP layer 307 to the RLC layer 306.

Subsequently, the communication unit 31 receives, in the RLC layer 306, pieces of user data (PDCP PDUs) from the PDCP layer. The communication unit 31 may divide or integrate packets as the pieces of user data to change sizes of the packets if needed. Further, the communication unit 31 sequentially assigns, in the RLC layer 306, numbers for the RLC layer to the packets (PDCP PDUs) received from the PDCP layer. Then, the communication unit 31 accumulates the packets (RLC PDUs) as the pieces of user data in a buffer of the RLC layer 306.

Thereafter, the communication unit 31 receives, from the MAC layer 302, a data amount of user data that can be transmitted to the macro base station 100. Then, the communication unit 31 transmits pieces of user data corresponding to the data amount received from the MAC layer 302, from the buffer of the RLC layer 306 to the MAC layer 302.

The communication unit 31 assembles, in the MAC layer 302, transmission data by using the pieces of user data (RLC PDUs) received from the RLC layer 306 (for example, generates a MAC PDU by adding a MAC header or the like). Then, the communication unit 31 performs, in the MAC layer 302, scheduling for data transmission, and outputs pieces of assembled data (RLC SDUs) to the small base station 200 in accordance with the schedule.

Next, notification of information indicating a data state (for example, a retention amount of data and a data reception state) to the macro base station 100 by the mobile station 300 will be described.

The control unit 34 receives a parameter setting for the PDCP status report via the communication unit 31. Then, the control unit 34 sets various parameters, such as a notification cycle for periodic notification and a threshold for the retention amount, for the PDCP status report by using the parameter setting for the PDCP status report.

The control unit 34 monitors the retention amount in the buffer in the PDCP layer 307 with respect to the packets received in the PDCP layer 307, at the time of receiving user data. Then, the control unit 34, when the retention amount exceeds the threshold for the retention amount, acquires a number assigned to the FMS packet among packets of pieces of user data that have not arrived from the small base station 200. Further, the control unit 34 acquires reception states of packets to be processed subsequent to the FMS packet.

Then, the control unit 34 generates the PDCP status report 400 in the format as illustrated in FIG. 7A, by using the acquired information.

Here, an example will be described in which the control unit 34 generates the PDCP status report when sequence numbers are assigned to pieces of user data as illustrated in in FIG. 6 and the packet with the sequence number 2 has not arrived at the mobile station 300.

In this case, the packets with the sequence numbers 1, 3, 5, and 7 arrive at the mobile station 300, but the packets with the sequence numbers 4, 6, and 8 do not arrive at the mobile station 300. This is because if the packet with the number 2 has not arrived at the PDCP layer, the packets with the subsequent numbers are retained in the lower layer and do not arrive at the PDCP layer.

However, in the case of a handover, even if the packet with the number 2 has not arrived at the PDCP layer, the packets with the sequence numbers 4, 6, and 8 are absorbed by the PDCP layer. Then, in the PDCP layer, the numbers assigned to the packets are guaranteed.

Therefore, the control unit 34 acquires the number 2 as the number assigned to the FMS packet among the packets of the pieces of user data that have not arrived from the small base station 200. Further, the control unit 34 acquires, as the reception states of the packets to be processed subsequent to the FMS packet, information indicating that the packets with the sequence numbers 1, 3, 5, and 7 have been received but the packets with the sequence numbers 4, 6, and 8 have not been received. Incidentally, the control unit 34 may acquire the number assigned to the FMS packet among the pieces of user data that have not arrived from the macro base station 100, and acquire the reception states of the packets to be processed subsequent to the FMS packet.

Then, the control unit 34 stores, in an area of the FMS in the PDCP status report, information indicating the packet with the sequence number 2. Further, the control unit 34 stores 101010 in each of the bits in the $Bitmap_1$ to the Bitmap$_N$ from the top. Further, the control unit 34 stores, in the area of the PDU Type, data that indicates a packet for notifying information on the retention amount in the buffer.

Thereafter, the control unit 34 transmits the generated PDCP status report to the communication unit 31.

The communication unit 31 transmits the PDCP status report received from the control unit 34 to the macro base station 100.

Further, the control unit 34 generates the PDCP status report in each cycle as stored. Then, the communication unit 31 transmits the PDCP status report to the macro base station 100.

Incidentally, in the embodiment, as a timing to notify the retention amount in the buffer, two timings, that is, a time when a threshold is exceeded and a periodic time, are used; however, the notification timing is not limited to this example. For example, the control unit 34 may employ only the periodic time as the notification timing. Further, the control unit 34 may employ the time when the threshold is exceeded as the notification timing, and send notifications at predetermined intervals until the threshold is not exceeded.

Next, with reference to FIG. 9, the overall flow to control the delivery amount of data at the time of dual connectivity will be described. FIG. 9 is a sequence diagram for explaining the overall flow of the delivery amount of data. Herein, a case will be described in which the macro base station 100 stops transmission of user data to the small base station 200 when the retention amount of data in the buffer of the mobile station 300 exceeds a threshold, and thereafter resume the transmission of user data when the buffer of the mobile station 300 becomes empty. Here, states 501 to 503 in FIG. 9 represent data retention states in the buffer of the mobile station 300, and states 511 to 514 represent data retention states in the buffer of the macro base station 100. Further, arrows and pieces of data with respect to the states 511 to 514 indicate that pieces of user data are transmitted from the buffer of the macro base station 100 to the small base station 200 at this time.

The macro base station 100 transmits user data to the small base station 200 via the wired link (Step S1). The small base station 200 transmits the user data to the mobile station 300 (Step S2).

At this time, data is accumulated in the buffer of the macro base station 100 as in the state 511. Then, the user data is transmitted from the buffer of the macro base station 100. Further, in the buffer of the mobile station 300, a small amount of data relative to the capacity of the buffer is accumulated as in the state 501.

Furthermore, the macro base station 100 transmits user data to the small base station 200 via the wired link (Step S3). The small base station 200 transmits the user data to the mobile station 300 (Step S4). In this case, however, a delay occurs in the transmission of data from the small base station 200 to the mobile station 300.

Therefore, in this case, the amount of data accumulated in the buffer of the mobile station 300 increases as in the state 502. In this state, the user data is accumulated in the buffer of the macro base station 100 as in the state 512, and user data is transmitted from the buffer of the macro base station 100.

Then, if the amount of data accumulated in the buffer of the mobile station 300 exceeds a threshold, the mobile station 300 transmits, to the macro base station 100, information indicating the retention amount of data in the buffer (Step S5). In response to this, the macro base station 100 stops transmission of user data to the small base station 200.

Therefore, while data is accumulated in the buffer of the macro base station 100 as in the state 513, user data is not transmitted from the buffer of the macro base station 100. Then, the mobile station 300 receives delayed data from the small base station 200 and performs data processing, so that the retention amount of data in the buffer is reduced. Then, as in the state 503, no data is retained in the buffer of the mobile station 300.

Thereafter, the mobile station 300 transmits, to the macro base station 100, information indicating that the retention amount of data in the buffer is zero, at a periodic timing to notify the retention amount of data (Step S6).

The macro base station 100, upon confirming that the retention amount of data in the buffer of the mobile station 300 is zero, resumes the transmission of user data to the small base station 200 (Step S7). At this time, data is accumulated in the buffer of the macro base station 100 as in the state 514, and the accumulated user data is transmitted from the buffer. Then, the small base station 200 transmits the user data to the mobile station 300 (Step S8).

Figure 10:
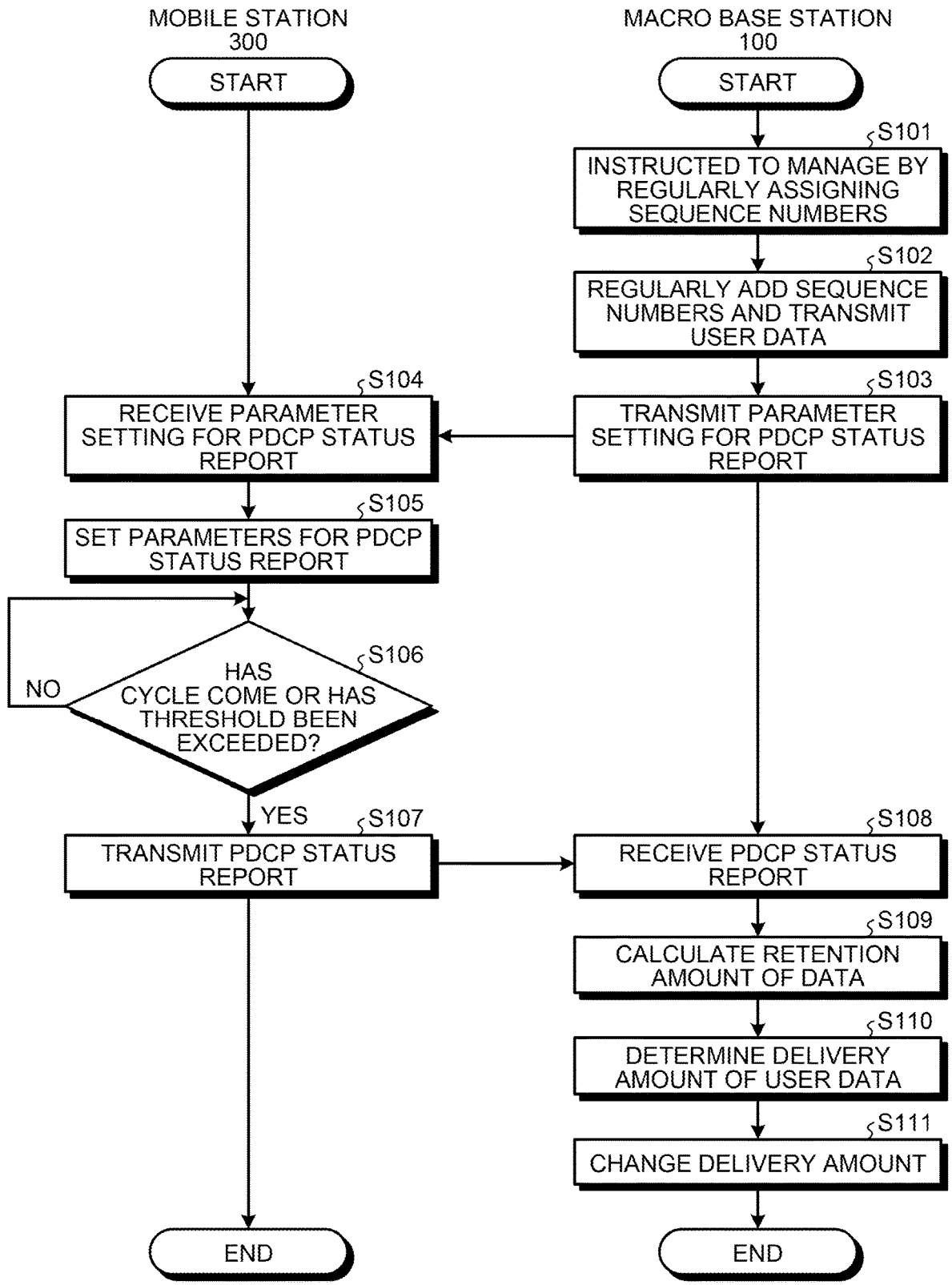
FIG. 10 is a flowchart to control an amount of user data delivered to a small base station in the communication system according to the second embodiment.

Next, with reference to FIG. 10, control on an amount of user data delivered from the macro base station 100 to the small base station 200 that are connected by dual connectivity in the communication system according to the embodiment will be explained. FIG. 10 is a flowchart to control the amount of user data delivered to the small base station in the communication system according to the second embodiment.

The control unit 14 of the macro base station 100 instructs the communication unit 11 to manage the amount of user data delivered to the small base station 200 by regularly assigning sequence numbers (Step S101).

The transmitting unit 13 regularly assigns, in the PDCP layer 101, the sequence numbers to packets of pieces of user data, and transmits the pieces of user data to the small base station 200 via the wired link (Step S102). The small base station 200 transmits the pieces of user data received from the macro base station 100 to the mobile station 300.

The transmitting unit 13 transmits a parameter setting including a threshold, a notification cycle, and the like for a PDCP status report to the mobile station 300 (Step S103).

The receiving unit 32 of the mobile station 300 receives the parameter setting for the PDCP status report from the macro base station 100 (Step S104).

The control unit 34 acquires the parameter setting for the PDCP status report from the receiving unit 32. Then, the control unit 34 sets parameters, such as the threshold and the notification cycle, for the PDCP status report (Step S105).

The control unit 34 determines whether the retention amount of data in the buffer of the mobile station 300 exceeds the threshold or whether the notification cycle has come (Step S106). If the retention amount of data does not exceed the threshold and if the notification cycle has not come (NO at Step S106), the control unit 34 waits until the retention amount of data exceeds the threshold or the notification cycle comes.

In contrast, if the retention amount of data exceeds the threshold or if the notification cycle has come (YES at Step S106), the control unit 34 generates a PDCP status report for notifying information indicating the retention amount of data. Then, the transmitting unit 33 transmits the PDCP status report generated by the control unit 34 to the macro base station 100 (Step S107).

The receiving unit 12 of the macro base station 100 receives the PDCP status report for notifying the information indicating the retention amount of data from the mobile station 300 (Step S108).

The control unit 14 acquires the PDCP status report from the receiving unit 12. Then, the control unit 14 calculates the retention amount of data in the buffer of the mobile station 300 by using the PDCP status report (Step S109).

Subsequently, the control unit 14 determines, from the calculated retention amount of data, an amount of user data delivered to the small base station 200 (Step S110).

The transmitting unit 13 receives a notice of the amount of user data delivered to the small base station 200 determined by the control unit 14. Then, the transmitting unit 13 changes the amount of user data delivered to the small base station 200 to a specified delivery amount (Step S111). Then, the transmitting unit 13 transmits, to the small base station 200, pieces of user data assigned with the regular sequence numbers, in accordance with the changed delivery amount.

Incidentally, in the flowchart in FIG. 10, the flow of a single changing process is described to explain the process of changing the delivery amount; however, in reality, the macro base station 100 and the mobile station 300 repeat the processes from Step S106 to Step S111 in FIG. 10.

Figure 11A:
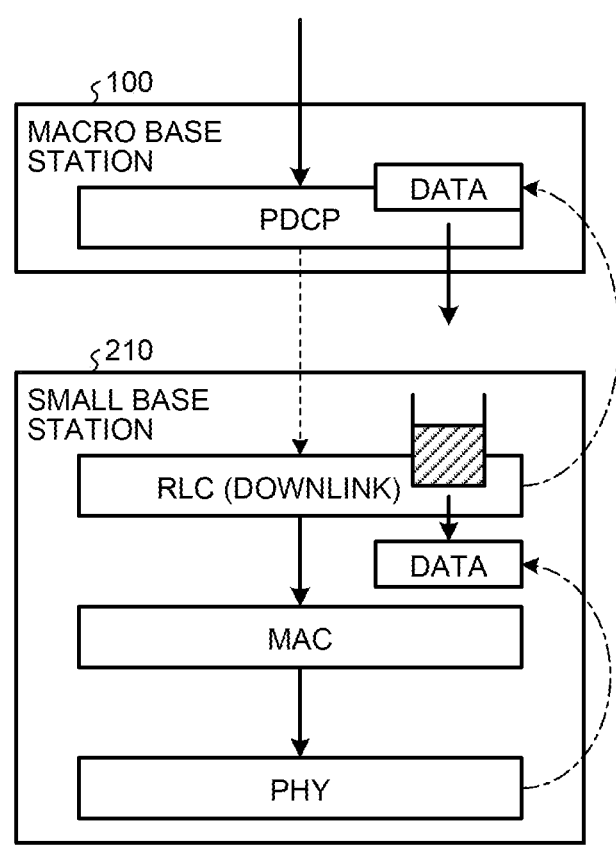
FIG. 11A is a diagram for explaining transmission of user data at the time of dual connectivity in a conventional communication system.

Next, with reference to FIG. 11A and FIG. 11B, a comparison between transmission of user data from the macro base station 100 to the small base station 200 with the dual connectivity in the communication system according to the embodiment and conventional dual connectivity will be described. FIG. 11A is a diagram for explaining transmission of user data at the time of dual connectivity in a conventional communication system. Further, FIG. 11B is a diagram for explaining transmission of user data at the time of dual connectivity in the communication system according to the second embodiment.

Figure 11B:
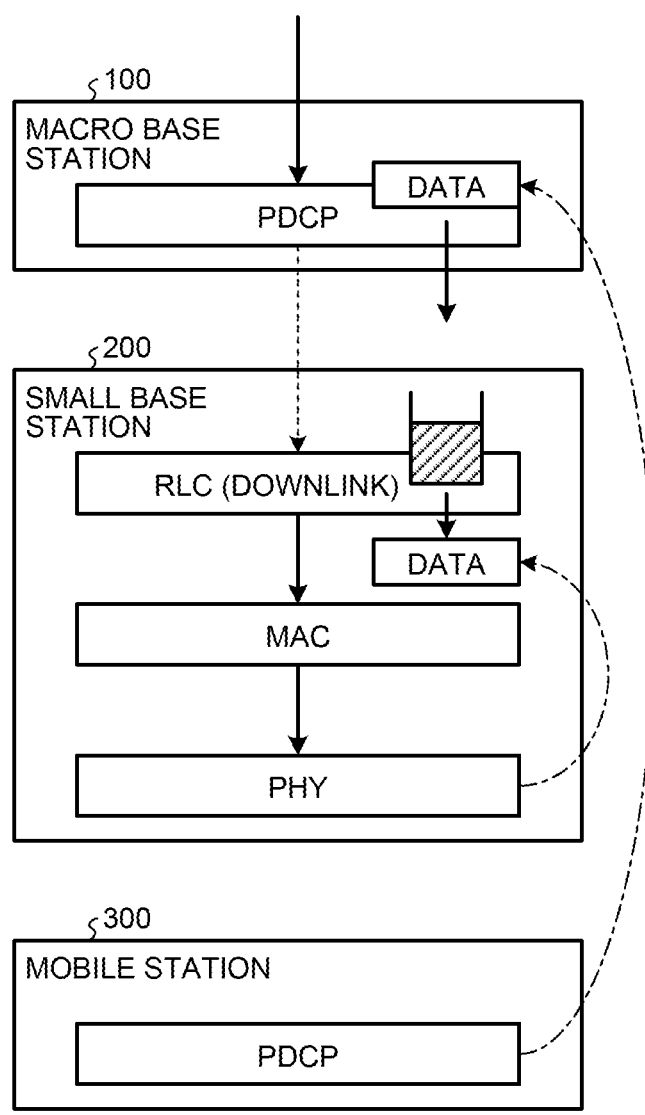
FIG. 11B is a diagram for explaining transmission of user data at the time of dual connectivity in the communication system according to the second embodiment.

A connection between a macro base station 110 and a small base station 210 in FIG. 11A and a connection between the macro base station 100 and the small base station 200 in FIG. 11B are connections indicated by dashed arrows, and are established by using wired links.

As illustrated in FIG. 11A, in the conventional communication system, the MAC layer of the small base station 210 acquires a data size that is determined by the PHY layer from a wireless quality (which is called uplink channel information (UCI) and corresponds to channel quality information (CQI) as a downlink wireless quality or a sounding reference signal (SRB) as an uplink wireless quality, which is measured by a mobile station). Then, the RLC layer of the small base station 210 acquires, from the MAC layer, the data size for transmission, and transmits user data corresponding to the data size to the MAC layer.

Then, the size of the user data transmitted from the RLC layer to the MAC layer of the small base station 210 is notified to the macro base station 110 via the wired link. The PDCP layer of the macro base station 110 transmits user data to the RLC layer of the small base station 210 in accordance with the size of the user data sent from the RLC layer of the small base station 210.

In this case, the macro base station 110 determines a delivery amount of user data to be transmitted to the RLC layer of the small base station 210, by using the information transmitted from the small base station 210 via the wired link. In the wired link, transmission of information may be delayed depending on the quality of communication. That is, the information transmitted from the small base station 210 via the wired link may be delayed, and if the delay occurs, it is difficult for the macro base station to appropriately transmit user data according to the transmission state of the small base station 210.

In contrast, as illustrated in FIG. 11B, in the communication system according to the embodiment, the MAC layer of the small base station 200 acquires a data size that is determined by the PHY layer from a wireless quality. Then, the RLC layer of the small base station 200 acquires, from the MAC layer, the data size for transmission, and transmits user data corresponding to the data size to the MAC layer.

Further, information indicating a retention amount of data in the buffer in the PDCP layer of the mobile station 300 is wirelessly transmitted from the mobile station 300 to the macro base station 100. Then, the macro base station 100 determines the delivery amount of user data from the information on the retention amount of data in the buffer in the PDCP layer of the mobile station 300, and transmits the user data with the delivery amount to the RLC layer of the small base station 200.

In this case, the macro base station 100 determines the delivery amount of user data to be transmitted to the RLC layer of small base station 200, by using the information wirelessly transmitted from the mobile station 300. The radio speed is higher than the speed of a wired link that has a low communication quality. That is, in the communication system according to the embodiment, the macro base station 100 can acquire the information for determining the delivery amount of user data to be transmitted to the RLC layer of small base station 200 at a higher speed as compared to the conventional technology. Therefore, the macro base station 100 according to the embodiment can appropriately transmit user data according to the transmission state of the small base station 200.

As described above, the wireless communication system according to the embodiment determines, in the dual connectivity, the delivery amount of user data to be transmitted from the primary wireless communication station to the secondary wireless communication station by using the retention amount of data in the buffer of the mobile station. Therefore, the primary wireless communication station can transmit user data with an appropriate delivery amount from the primary wireless communication station to the secondary wireless communication station. Therefore, according to the wireless communication system of the embodiment, it is possible to improve the communication efficiency between the wireless communication stations.

Further, the retention amount of data in the buffer is notified by using a PDCP status report as a known signal (signaling); therefore, it is possible to realize various functions as described above by only adding a small change to a known system. That is, the wireless communication system according to the embodiment can be constructed easily.

(Hardware Configuration)

Figure 12:
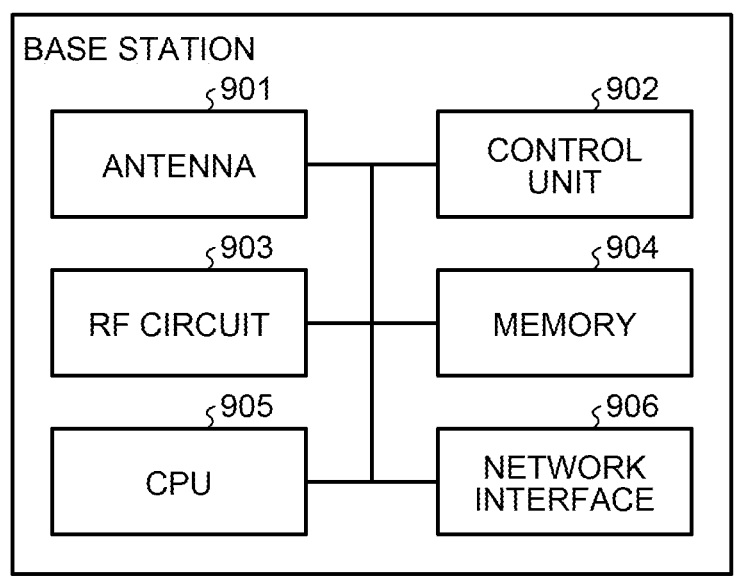
FIG. 12 is a hardware configuration diagram of a base station.

FIG. 12 is a hardware configuration diagram of a base station. Examples of the base station include the wireless communication devices 1 and 2 illustrated in FIG. 1, and the macro base station 100 and the small base station 200 illustrated in FIG. 4.

The base station includes an antenna 901, a control unit 902, an RF circuit 903, a memory 904, a CPU 905, and a network interface 906.

The control unit 902 realizes the functions of the control unit 14 illustrated in FIG. 1 and FIG. 4, for example.

The network interface 906 is an interface for connecting a network by a wired link. For example, the macro base station 100 and the small base station 200 are connected by the wired link via the network interface 906.

The CPU 905, the memory 904, and the RF circuit 903 realize the functions of the communication unit 11 including the receiving unit 12 and the transmitting unit 13, and the functions of the communication unit 21 including the receiving unit 22 and the transmitting unit 23 illustrated in FIG. 1 and FIG. 4.

For example, the memory 904 stores therein various programs, such as a program for realizing the functions of the communication unit 11 or the communication unit 21.

The CPU 905 reads the program stored in the memory 904, and realizes the functions of the communication unit 11 or the communication unit 21 in cooperation with the RF circuit 903 or the like.

Figure 13:
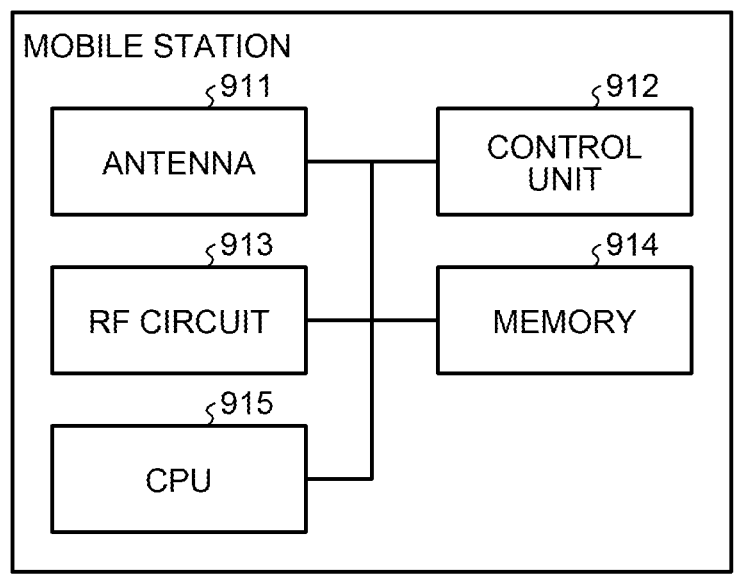
FIG. 13 is a hardware configuration diagram of a mobile station.

FIG. 13 is a hardware configuration diagram of a mobile station. Examples of the mobile station include the wireless communication device 3 illustrated in FIG. 1 and the mobile station 300 illustrated in FIG. 4.

The mobile station includes an antenna 911, a control unit 912, an RF circuit 913, a memory 914, and a CPU 915.

The control unit 912 realizes the functions of the control unit 34 illustrated in FIG. 1 and FIG. 4, for example.

The CPU 915, the memory 914, and the RF circuit 913 realize the functions of the communication unit 31 including the receiving unit 32 and the transmitting unit 33 illustrated in FIG. 1 and FIG. 4.

For example, the memory 914 stores therein various programs, such as a program for realizing the functions of the communication unit 31.

The CPU 915 reads the program stored in the memory 914, and realizes the functions of the communication unit 31 in cooperation with the RF circuit 913 or the like.

(Modification)

In the above-described second embodiment, a case has been described in which the macro base station 100 serves as the primary base station and the small base station 200 serves as the secondary base station. However, the configurations of the base stations are not limited to this example. For example, even in a system configuration as illustrated in FIG. 14, the wireless communication system according to the embodiment can operate.

Figure 14:
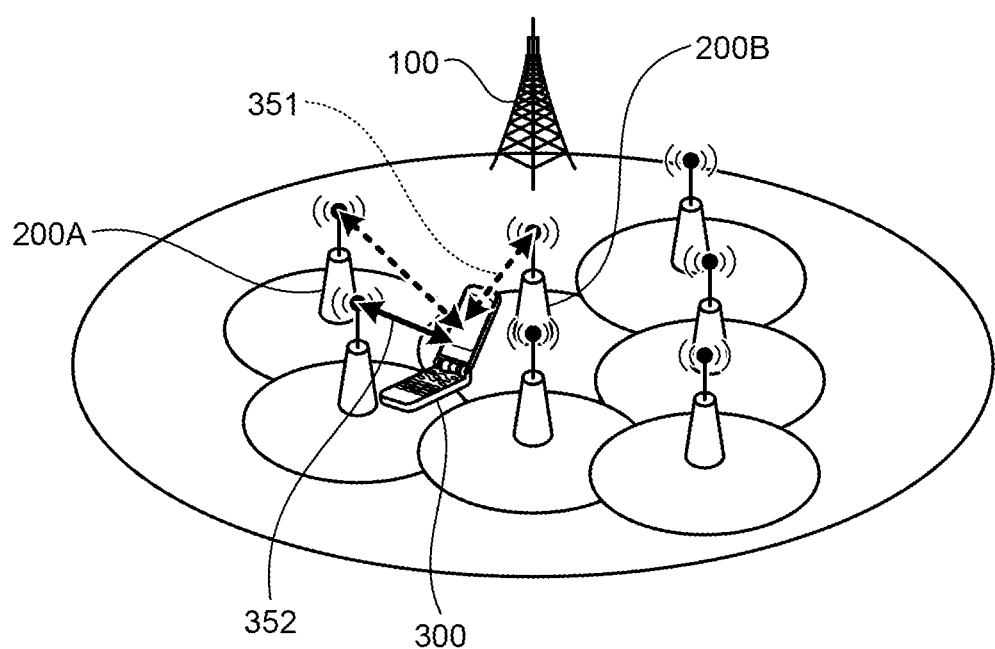
FIG. 14 is a schematic diagram illustrating dual connectivity in a wireless communication system according to a modification of the second embodiment.

FIG. 14 is a schematic diagram illustrating dual connectivity in a wireless communication system according to a modification of the second embodiment. The wireless communication system according to the modification includes a small base station 200A as the wireless communication device 1 in FIG. 1. Further, a small base station 200B is provided as the wireless communication device 2 in FIG. 1. Furthermore, the mobile station 300 is provided as the wireless communication device 3 in FIG. 1.

The mobile station 300 connects to the small base station 200A as a primary base station. The mobile station 300 is connected to the small base station 200A by the control plane 352 indicated by a solid arrow and the user plane 351 indicated by a dashed arrow. Further, the mobile station 300 connects to the small base station 200B as a secondary base station. The mobile station 300 is connected to the small base station 200B by the user plane 351.

The configuration of the wireless communication system as illustrated in FIG. 14 is usually employed to improve the characteristics of the uplink communication.

Further, while the small base station 200 is connected to the macro base station 100 in FIG. 14, the small base station 200 may be directly connected to a higher-layer communication device of the macro base station 100.

Third Embodiment

Next, a third embodiment will be described. A wireless communication system according to the third embodiment differs from the wireless communication system of the second embodiment in that a data plane is separated between the RLC layer and the MAC layer. In the description below, explanations of the components with the same functions will be omitted.

Figure 15:
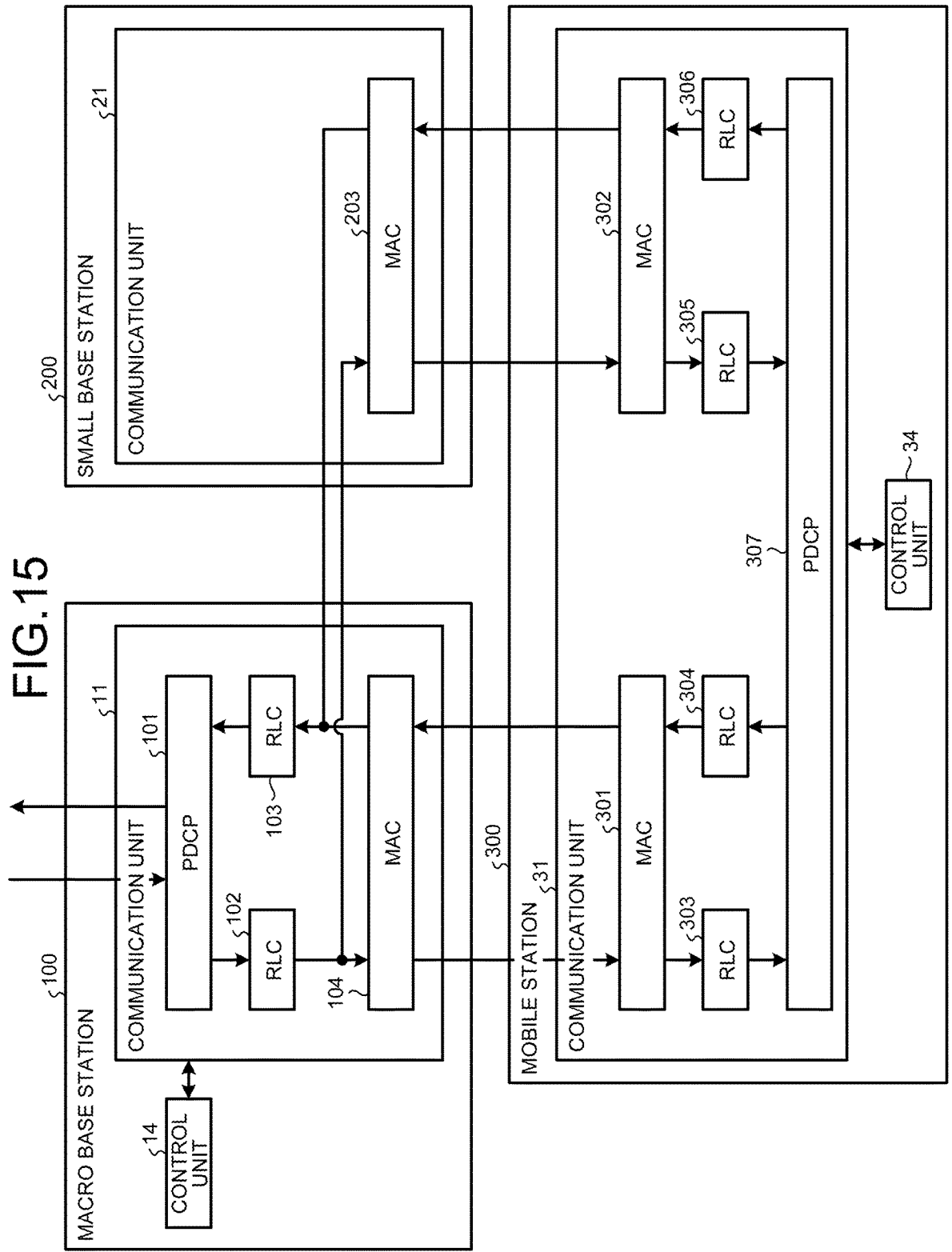
FIG. 15 is a diagram illustrating transmission and reception of user data performed by using each of link layers in a wireless communication system according to a third embodiment.

FIG. 15 is a diagram illustrating transmission and reception of user data performed by using each of link layers in the wireless communication system according to the third embodiment.

The communication unit 11 of the macro base station 100, in the case of downlink communication, transmits packets of pieces of user data, to which numbers are regularly assigned in the PDCP layer 101, to the RLC layer 102.

Then, the communication unit 11 receives a delivery amount of user data from the control unit 14. Subsequently, the communication unit 11 performs a process of dividing or integrating packets or adding numbers in the RLC layer. Thereafter, the communication unit 11 extracts the packets to which the numbers are added in the PDCP layer 101 as packets to be transmitted to the small base station 200. Then, the communication unit 11 transmits, to the MAC layer 203 of the small base station 200, the extracted packets of pieces of user data with the delivery amount that is specified by the control unit 14 via the wired link. Further, the communication unit 11 outputs, to the MAC layer 104, packets to which numbers are assigned so as to be processed in the own station.

In the case of uplink communication, the communication unit 11 receives, in the RLC layer 103, pieces of user data from the MAC layer 203 of the small base station 200 via the wired link. Then, the communication unit 11 divides or integrates packets of the received pieces of user data and arranges them in numerical order. Thereafter, the communication unit 11 transmits the pieces of user data received from the small base station 200, from the RLC layer 103 to the PDCP layer 101.

The communication unit 21 of the small base station 200, in the case of downlink communication, acquires, in the MAC layer 203, pieces of user data from the RLC layer 102 of the macro base station 100 via the wired link. Then, the communication unit 21 transmits the pieces of user data from the MAC layer 203 to the mobile station 300.

In the case of uplink communication, the communication unit 21 of the small base station 200 transmits the pieces of user data received from the mobile station 300, from the MAC layer 203 to the RLC layer 103 of the macro base station 100.

In this manner, even when the data plane is separated between the RLC layer and the MAC layer, it is possible to determine the amount of data delivered to the secondary wireless communication station according to the retention amount of data in the buffer of the mobile station. That is, the primary wireless communication station can transmit pieces of user data with the appropriate delivery amount from the primary wireless communication station to the secondary wireless communication station. Therefore, the wireless communication system according to the embodiment can improve the communication efficiency between wireless communication stations.

Fourth Embodiment

Next, a fourth embodiment will be described. A wireless communication system according to the fourth embodiment differs from the wireless communication system of the second embodiment in that a data plane is separated in a stage before the PDCP layer. In the description below, explanations of the components with the same functions will be omitted.

Figure 16:
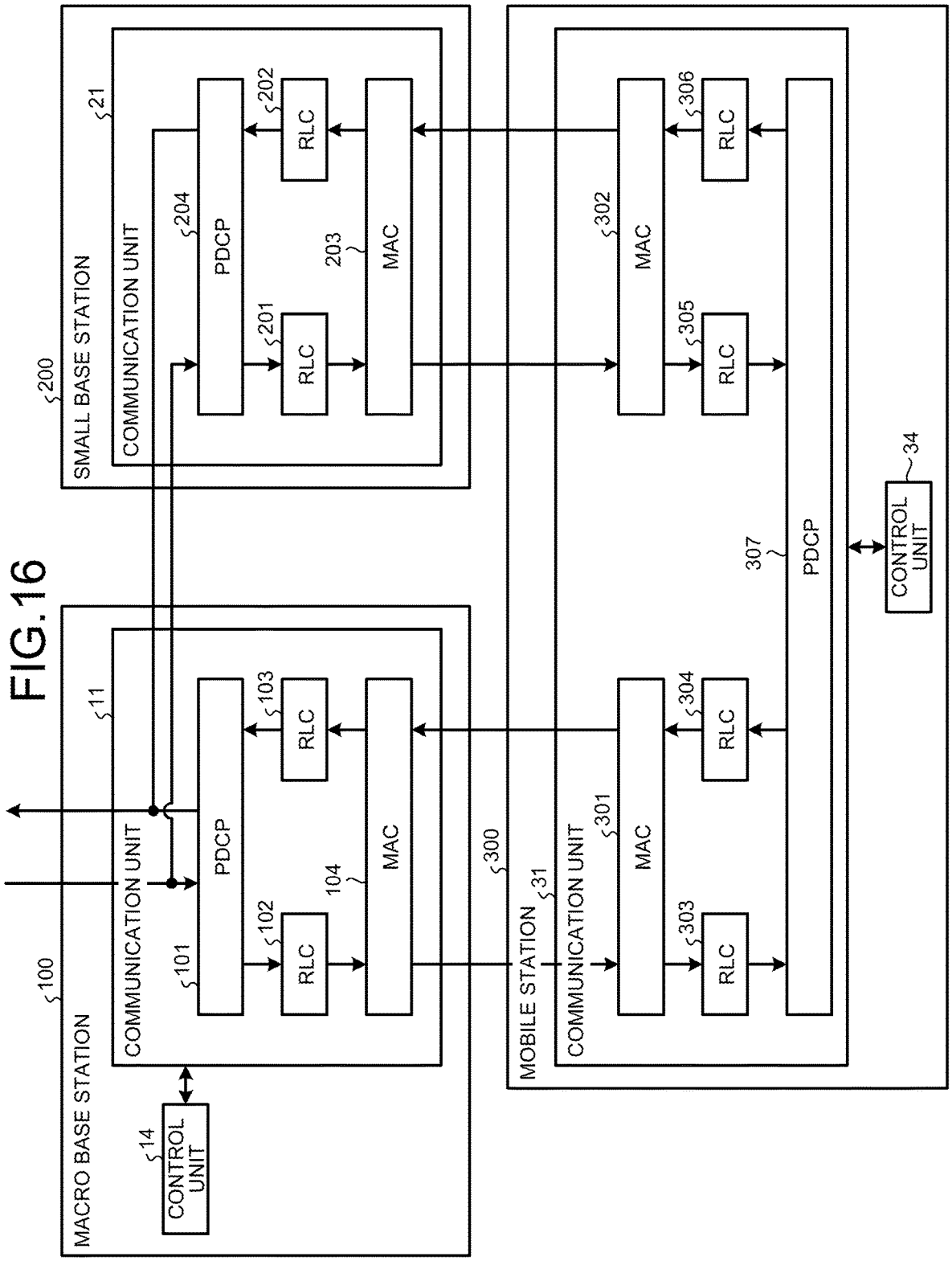
FIG. 16 is a diagram illustrating transmission and reception of user data performed by using each of link layers in a wireless communication system according to a fourth embodiment.

FIG. 16 is a diagram illustrating transmission and reception of user data performed by using each of link layers in the wireless communication system according to the fourth embodiment.

In the case of downlink communication, the communication unit 11 of the macro base station 100 receives a delivery amount of user data from the control unit 14. Then, the communication unit 11 transmits, to a PDCP layer 204 of the small base station 200, packets of pieces of user data received from the higher-layer communication device 4 with the delivery amount that is specified by the control unit 14. At this time, the communication unit 11 distributes the pieces of user data such that the numbers added in the PDCP layers 101 and 204 are guaranteed. For example, if it is determined that even numbers are added in own station and odd numbers are added in the small base station 200, the communication unit 11 transmits, to the small base station 200, the packets that are assigned with the odd numbers when the packets are arranged.

Further, the communication unit 11 transmits the rest of the pieces of user data to the PDCP layer 101 of the own station.

Subsequently, the communication unit 11 adds numbers to packets of the pieces of user data according to a rule defined in the PDCP layer 101. For example, the communication unit 11 adds even numbers to the packets. Then, the communication unit 11 transmits the packets of the pieces of user data from the PDCP layer 101 to the RLC layer 102.

In the case of uplink communication, the communication unit 11 receives pieces of user data from the PDCP layer 204 of the small base station 200 via the wired link. Then, the communication unit 11 transmits the received pieces of user data to the higher-layer communication device 4.

The communication unit 21 of the small base station 200, in the case of downlink communication, acquires, in the PDCP layer 204, pieces of user data from the macro base station 100 via the wired link. Then, the communication unit 21 adds numbers to packets of the pieces of user data according to a rule defined in the PDCP layer 204. For example, the communication unit 21 adds odd numbers to the packets in the PDCP layer 204. Then, the communication unit 21 transmits the pieces of user data from the PDCP layer 204 to the MAC layer 203.

In the case of uplink communication, the communication unit 21 of the small base station 200 transmits the pieces of user data from the RLC layer 202 to the PDCP layer 204. Then, the communication unit 21 performs decoding or security check on the pieces of user data in the PDCP layer 204. Then, the communication unit 21 transmits the pieces of user data from the PDCP layer 204 to the macro base station 100.

In this manner, even when the data plane is separated in a stage before the PDCP layer, it is possible to determine the amount of data delivered to the secondary wireless communication station according to the retention amount of data in the buffer of the mobile station. That is, the primary wireless communication station can transmit pieces of user data with the appropriate delivery amount from the primary wireless communication station to the secondary wireless communication station. Therefore, the wireless communication system according to the embodiment can improve the communication efficiency between wireless communication stations.

Fifth Embodiment

Next, a wireless communication system according to a fifth embodiment will be explained. The wireless communication system according to the embodiment differs from the second embodiment in that a retention amount of data in an RLC buffer of the small base station is notified by using RLC feedback information.

Figure 17:
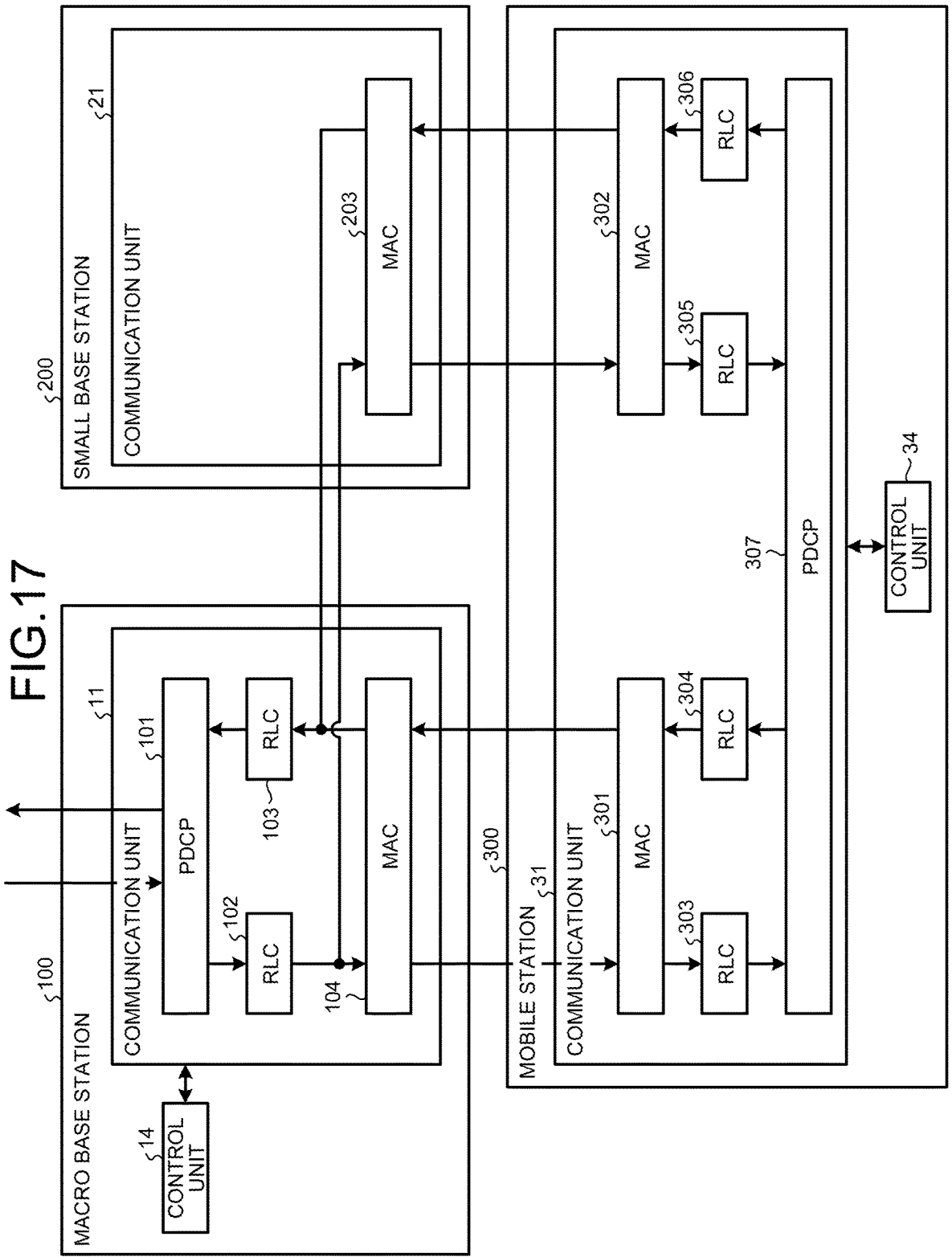
FIG. 17 is a diagram illustrating transmission and reception of user data performed by using each of link layers in a wireless communication system according to a fifth embodiment.

FIG. 17 is a diagram illustrating transmission and reception of user data performed by using each of link layers in the wireless communication system according to the fifth embodiment. In the embodiment, as illustrated in FIG. 17, an example will be described in which a data plane is separated between the RLC layer and the MAC layer in the macro base station 100. In the following, the same functions as those of the second embodiment will be omitted.

The communication unit 11 of the macro base station 100 separates a data plane after the RLC layer 102, and transmits pieces of user data to the small base station 200. At this time, the communication unit 11 transmits the pieces of user data with a delivery amount specified by the control unit 14.

The control unit 14, at the start of dual connectivity, notifies the mobile station 300 of a setting of an RLC status report that is the RLC feedback information via the communication unit 11.

Figure 18:
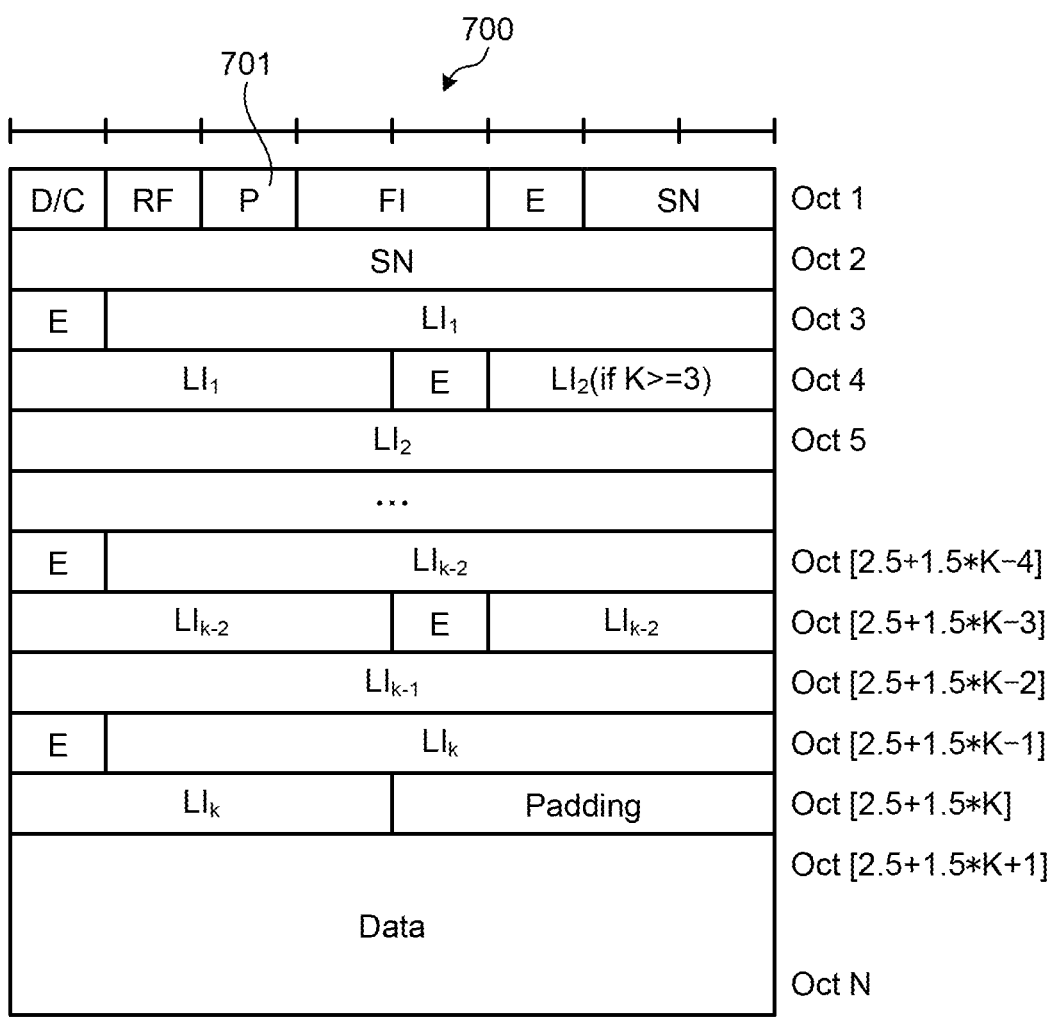
FIG. 18 is a diagram illustrating an example of a format of a transmission packet.

Thereafter, the control unit 14 manages the number of packets transmitted during the dual connectivity by using a counter, and sets flags to packets to be transmitted to the mobile station 300 when the counter reaches a certain value. FIG. 18 is a diagram illustrating an example of a format of a transmission packet. For example, the control unit 14 sets a flag of P (Poll) 701 of a transmission packet 700 in FIG. 18 to "1". The P 701 is a bit for setting a polling command. The control unit 14 transmits the packet to which the flag is set to the mobile station 300, to notify the mobile station 300 of transmission of an RLC status report. In normal data, for example, the flag of the P 701 is set to "0".

Further, the control unit 14 calculates the amount of transmitted data, and if the amount of transmitted data exceeds a predetermined value, sets a flag in the same manner as in the case where the counter reaches a certain value. In this case, the control unit 14 clears the amount of transmitted data after setting the flag, and repeatedly calculates the amount of subsequently-transmitted data.

Alternatively, a timing to request transmission of an RLC status report is not specifically limited. For example, the control unit 14 may set a flag at a constant period.

The control unit 14 acquires the RLC status report from the communication unit 11. Then, the control unit 14 acquires, from the RLC status report, the sequence number of the oldest packet that has not been received by the mobile station 300. Further, if a packet loss has occurred, the control unit 14 acquires a sequence number of a lost packet among divided packets.

Figures 19, 20:
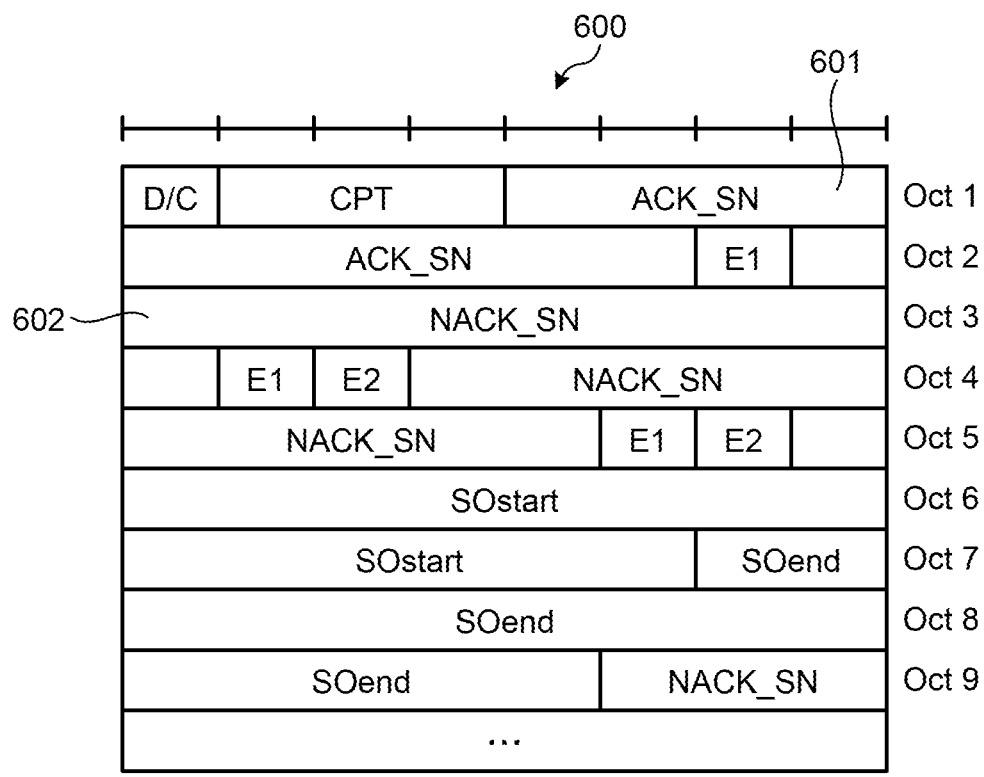
FIG. 19 is a diagram illustrating a format of an RLC status report.
FIG. 20 is a diagram illustrating contents stored in CPT.

Incidentally, the RLC status report for transmitting information indicating the retention amount of data in the buffer of the mobile station 300 will be explained. FIG. 19 is a diagram illustrating a format of the RLC status report. An RLC status report 600 includes an ACK_SN 601. The ACK_SN 601 indicates a sequence number of a next non-received RLC data PDU. However, this indicates a sequence number of an RLC PDU (RLC data PDU) for which non-reception has not been notified in a STATUS PDU. That is, once "non-reception" is reported by the STATUS PDU, this sequence number is not set as the ACK_SN 601.

Further, the RLC status report 600 includes a NACK_SN 602. The NACK_SN 602 indicates a sequence number of an AMD PDU (or a part thereof) for which a loss is detected by an AM RLC entity on the reception side.

Further, SOstart indicates a part of an AMD PDU with a sequence number for which a loss is detected by an AM RLC entity on the reception side (NACK_SN; for example, NACK_SN related to SOstart). Further, SOend indicates a part of an AMD PDU with a sequence number for which a loss is detected by an AM RLC entity on the reception side (NACK_SN; for example, NACK_SN related to SOend).

Furthermore, the RLC status report 600 includes a carrier packet type (CPT).

FIG. 20 is a diagram illustrating contents corresponding to a value stored in the CPT. As illustrated in FIG. 20, if the value of the CPT is "001", it indicates feedback information on a secondary connection. Further, if the value of the CPT is "002", it indicates feedback information on a third connection. Furthermore, values of the CPT from "003" to "111" are reserves. In the embodiment, a bit sequence of "001" is stored in the CPT of the RLC status report 600.

However, it may be possible to specify a new different value as a CPT to indicate notification of information on the retention amount of data. For example, it may be possible to determine, in advance, any of "003" to "111" of the CPT as a value on the retention amount of data in the buffer of the mobile station 300, and store the predetermined value in the CPT when the information on the retention amount of data is to be notified.

The control unit 14 checks whether the value of the CPT of the acquired RLC status report 600 is a value that is determined in advance and that indicates an RLC status report for transmitting the information on the retention amount of data in the buffer of the mobile station 300. Then, the control unit 14 checks the ACK_SN 601 and acquires a sequence number of the oldest packet that has not arrived at the mobile station 300. Thereafter, the control unit 14 specifies packets that follow the sequence number of the oldest packet that has not arrived at the mobile station 300, and obtains a retention amount of data in the RLC buffer of the small base station 200. Further, for example, the control unit 14 obtains a total amount of areas indicated by NACK_SN, SOstart, and SOend through conversion to bytes, and obtains the retention amount of data in the RLC buffer of the small base station 200.

Figure 21:
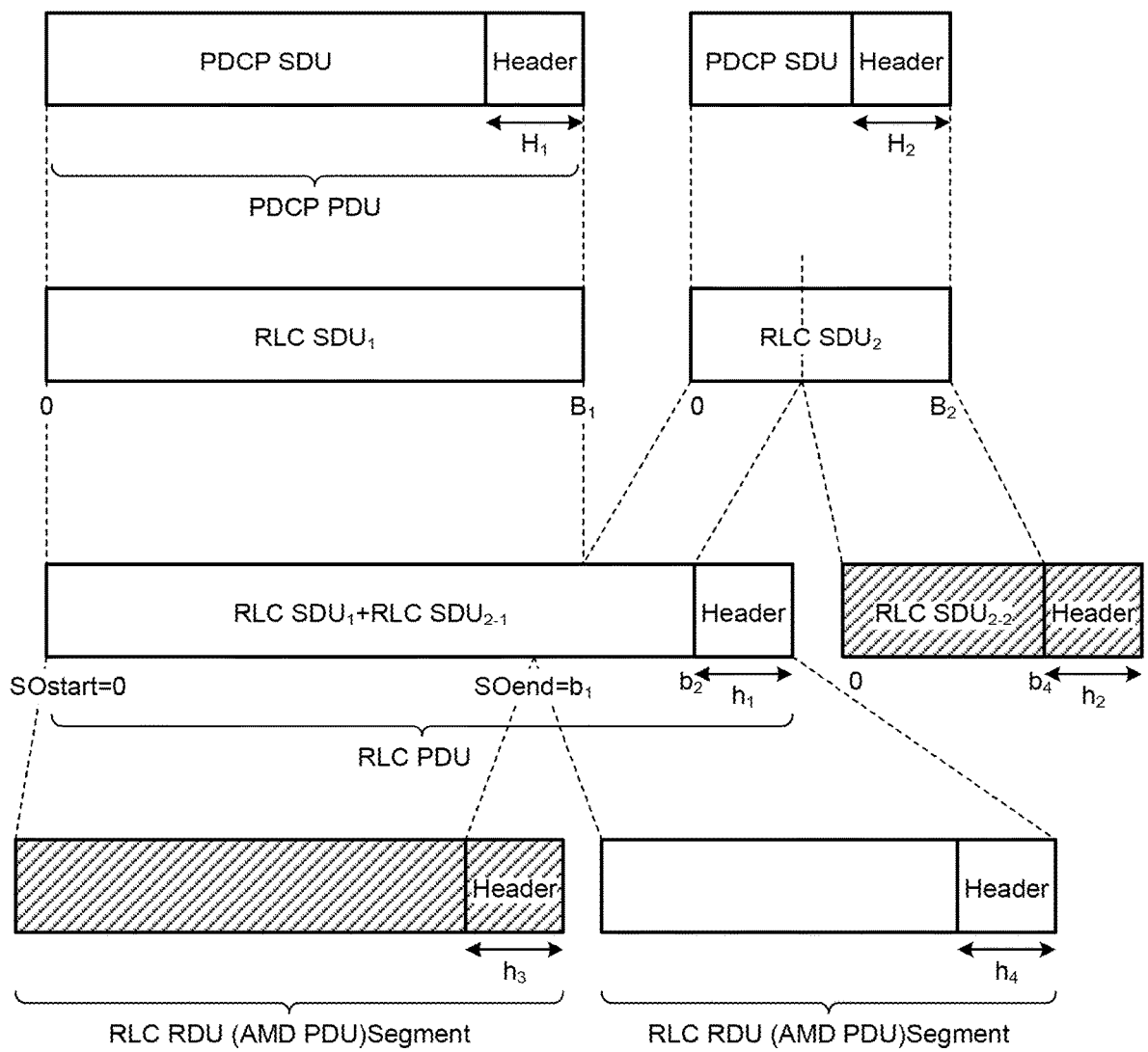
FIG. 21 is a diagram for explaining an example of a method of calculating a retention amount of data.

FIG. 21 is a diagram for explaining an example of a method of calculating a retention amount of data. In FIG. 21, hatched portions indicate pieces of data whose delivery is not confirmed. If a transmission side receives the RLC status report, the following calculations are possible.

Specifically, a retention amount of an RLC PDU=$(b_1+h_3)+(b_4+h_2)$ or $(SOend+h_3)+(b_4+h_2)$. Further, a retention amount of an RLC SDU=$B_1+B_2$. Furthermore, a retention amount of a PDCP PDU=$B_1+B_2$. Moreover, a retention amount of a PDCP SDU=$(B_1-H_1)+(B_2-H_2)$.

Then, the control unit 14 determines a delivery amount of user data depending on the retention amount of data in the buffer of the small base station 200. Then, the control unit 14 notifies the communication unit 11 of the determined delivery amount. Incidentally, among the above-described retention amounts, any of the retention amounts may be used to determine the delivery amount of user data.

The control unit 34 of the mobile station 300 receives a setting of an RLC status report from the macro base station 100 at the start of the dual connectivity. Then, the control unit 34 sets notification of the RLC status report.

Then, the control unit 34 receives, from the macro base station 100, a packet to which a flag for requesting transmission of the RLC status report is set, while the dual connectivity is implemented. Then, the control unit 34 generates the RLC status report by using a sequence number of the received packet and a sequence number of a packet that is detected as having been lost. Thereafter, the control unit 34 performs RLC feedback by transmitting the generated RLC status report to the small base station 200 via the communication unit 31, and transmits the RLC status report to the macro base station 100.

Figure 22:
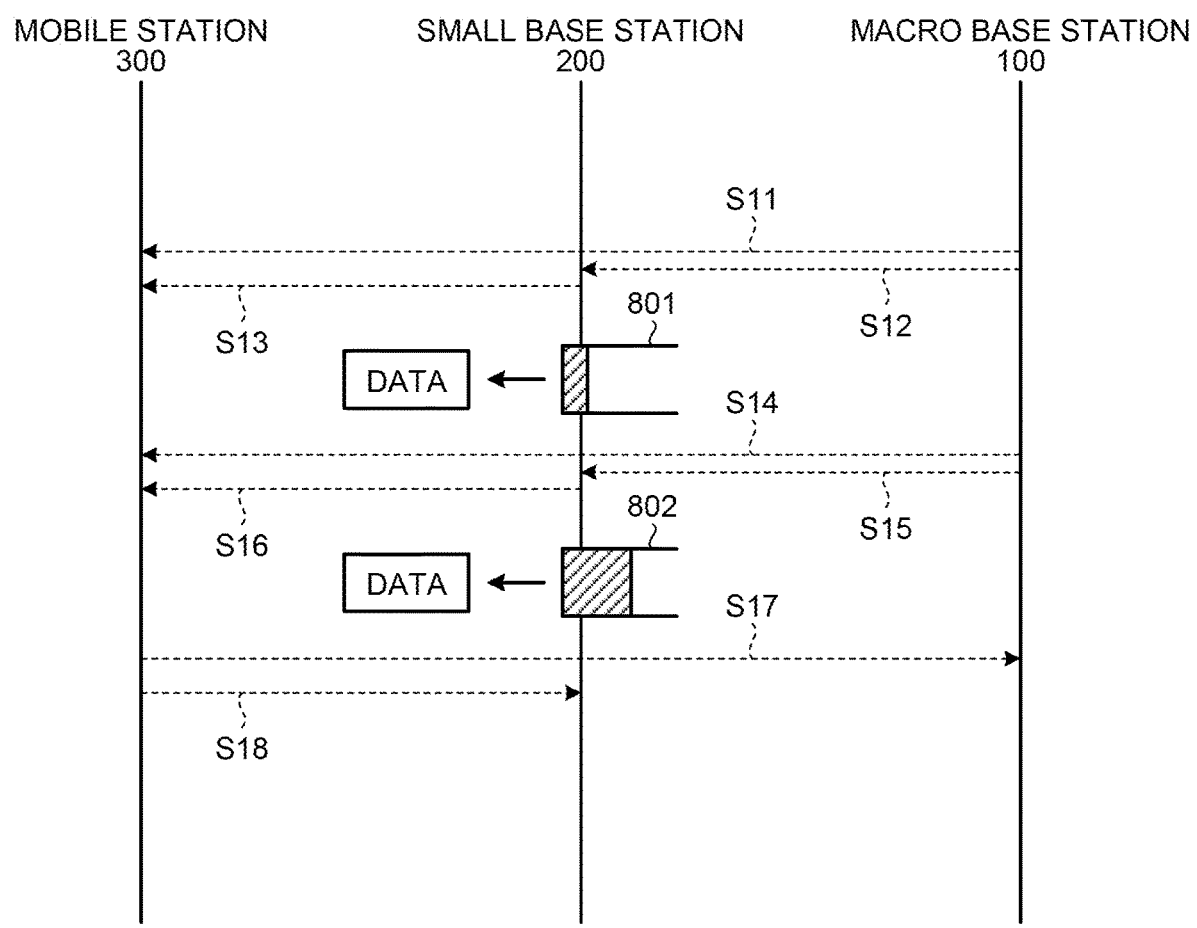
FIG. 22 is a sequence diagram for explaining the overall flow to transmit the RLC status report in the wireless communication device according to the fifth embodiment.

Next, with reference to FIG. 22, the overall flow to transmit the RLC status report will be described. FIG. 22 is a sequence diagram for explaining the overall flow to transmit the RLC status report in the wireless communication device according to the fifth embodiment. Here, states 801 and 802 in FIG. 22 represent data retention states in the RLC buffer of the small base station 200. Further, arrows and pieces of data with respect to the states 801 and 802 indicate that pieces of user data are transmitted from the RLC buffer of the small base station 200 at this time.

The macro base station 100 transmits, to the mobile station 300, a packet with a flag set to "0", in order to notify that transmission of the RLC status report is not requested (Step S11). Further, the macro base station 100 transmits user data to the small base station 200 (Step S12). The small base station 200 transmits the user data to the mobile station 300 (Step S13).

At this time, data is accumulated in the RLC buffer of the small base station 200 as in the state 801. Then, the user data is output from the RLC buffer of the small base station 200.

Thereafter, if the number of packets exceeds a certain value or the amount of transmitted data exceeds a threshold, the macro base station 100 transmits, to the mobile station 300, a packet with a flag set to "1", in order to notify a request for transmission of the RLC status report (Step S14). Thereafter, the macro base station 100 continues to transmit user data to the small base station 200 (Step S15). The small base station 200 continues to transmit user data to the mobile station 300 (Step S16).

Even at this time, data is accumulated in the RLC buffer of the small base station 200 as in the state 802. Then, the user data is output from the RLC buffer of the small base station 200.

Then, upon receiving the packet with the flag of "1", the mobile station 300 transmits the RLC status report to the macro base station 100 (Step S17). Further, the mobile station 300 performs RLC feedback by transmitting the RLC status report to the small base station 200 (Step S18).

Thereafter, the macro base station 100 obtains a retention amount of data in the RLC buffer of the small base station 200 from the received RLC status report, and controls an amount of data delivered to the small base station 200 according to the obtained retention amount of data.

As described above, the primary wireless communication station according to the embodiment determines an amount of user data delivered to the secondary wireless communication station, according to the retention amount of data in the RLC buffer of the secondary_wireless communication station by using the RLC status report. Therefore, the primary wireless communication station can transmit user data with an appropriate delivery amount from the primary wireless communication station to the secondary wireless communication station. Consequently, the wireless communication system according to the embodiment can improve the communication efficiency between wireless communication stations.

(Modification)

In the fifth embodiment, the macro base station 100 transmits a packet, to which a flag is set, to request transmission of the RLC status report; however, it is not limited thereto. For example, the small base station 200 may transmit a packet, to which a flag is set, to request transmission of the RLC status report.

In this case, the control unit 24 of the small base station 200 may monitor the number of packets or the amount of transmitted data to determine whether to set a flag, similarly to the control unit 14 of the macro base station 100 of the second embodiment.

Alternatively, similarly to the fifth embodiment, the macro base station 100 may determine whether to set a flag and transmit a packet, to which the flag is set, to the small base station 200, and the small base station 200 may transfer the packet to the mobile station 300.

Moreover, while the mobile station 300 wirelessly transmits the RLC status report to the macro base station 100 in the fifth embodiment, the transmission method is not limited to this example. For example, it may be possible to transmit the RLC status report to the macro base station 100 by using the wired link.

Furthermore, while a polling command conventionally defined as a packet format is used to request transmission of the RLC status report in the fifth embodiment, the method to request transmission is not limited to this example. For example, it may be possible to define a new polling command to request transmission.

Moreover, it may be possible to cause the mobile station 300 to perform PDCP status reporting instead of a status report at the RLC level, to cause the macro base station 100 to obtain the retention amount of data in the RLC buffer of the secondary wireless communication station.

The embodiments disclosed above may be arbitrarily combined without departing from the scope and spirit of the invention. Further, downlink communication is mainly explained and uplink communication associated with the downlink communication is also explained; however, when uplink communication is performed and downlink communication is associated with the uplink communication, the embodiments can be applied in the same manner.

According to an embodiment of a wireless communication system, a mobile station, a base station, and a wireless communication method of the disclosed technology, it is possible to improve communication efficiency between wireless communication stations.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A mobile station comprising:
a processor; and
a memory storing a program that causes the processor to:
operate a first logical processing subject and a second logical processing subject that operates in association with the first logical processing subject and perform dual connectivity communications with a first base station and a second base station;
accumulate data received from the second base station; and
notify directly the first base station of data receiving status, wherein an amount of downlink data transmitted from the first base station to the second base station is controlled by the first base station based on the data receiving status of the data received from the second base station.

2. The mobile station according to claim 1, wherein the processor is further configured to accumulate data received from the first base station via the second base station.

3. The mobile station according to claim 1, wherein the processor is further configured to perform dual connectivity communications by instructing the first logical processing subject to communicate with the first base station and instructing the second logical processing subject to communicate with the second base station.

4. The mobile station according to claim 1, wherein the processor is further configured to notify the first base station of the data receiving status based on information received from the first base station with respect to a cycle for periodic notification.

5. The mobile station according to claim 1, wherein the processor is further configured to send a notification when a retention amount of downlink data exceeds a threshold.

6. The mobile station according to claim 1, wherein processor is further configured to notify the first base station of the data receiving status by using a PDCP status report.

7. A wireless communication system comprising:
a first base station;
a second base station; and
a mobile station,
the mobile station comprising:
a processor; and
a memory storing a program that causes the processor to:
operate a first logical processing subject and a second logical processing subject that operates in association with the first logical processing subject, and perform dual connectivity communications with the first base station and the second base station;
accumulate data received from the second base station; and
notify directly the first base station of data receiving status, wherein an amount of downlink data transmitted from the first base station to the second base station is controlled by the first base station based on the data receiving status of the data received from the second base station;
the first base station comprising:
a second transmitter that transmits data to the second base station; and
a controller that receives data receiving status from the mobile station and controls an amount of downlink data transmitted by the second transmitter, and
the second base station comprising a third transmitter that transmits data received from the first base station to the mobile station.

8. A base station configured to communicate with a mobile station, the base station comprising:
a communication unit that communicates with the mobile station;
a transmitter that transmits data to a second base station; and
a controller that receives data receiving status in the mobile station from the mobile station being configured to receive data from the base station via the second base station and controls an amount of downlink data transmitted from the transmitter to the second base station, wherein an amount of downlink data transmitted from the transmitter to the second base station is controlled by the base station based on the data receiving status of the data received from the second base station.

9. The base station according to claim 8, wherein the transmitter communicates with the second base station by using a link layer protocol.

10. A wireless communication method by a mobile station comprising:

performing dual connectivity communications with a first base station and a second base station by using a first logical processing subject and a second logical processing subject that operates in association with the first logical processing subject;

accumulating in a buffer, data received from the second base station; and notifying directly the first base station of data receiving status in the buffer, wherein an amount of downlink data transmitted from the first base station to the second base station is controlled by the first base station based on the data receiving status in the mobile station of the data received from the second base station.

* * * * *